Dec. 10, 1957  M. WATTER  2,815,866
APPARATUS FOR TRANSFERRING ARTICLES
FROM ONE MACHINE TO ANOTHER
Filed Dec. 15, 1954  24 Sheets-Sheet 1

INVENTOR
Michael Watter
BY
William R. Glisson
ATTORNEY

Dec. 10, 1957　　　　　　　M. WATTER　　　　　　2,815,866
APPARATUS FOR TRANSFERRING ARTICLES
FROM ONE MACHINE TO ANOTHER
Filed Dec. 15, 1954　　　　　　　　　　　　24 Sheets-Sheet 5

INVENTOR
Michael Watter

BY
William R. Glisson
ATTORNEY

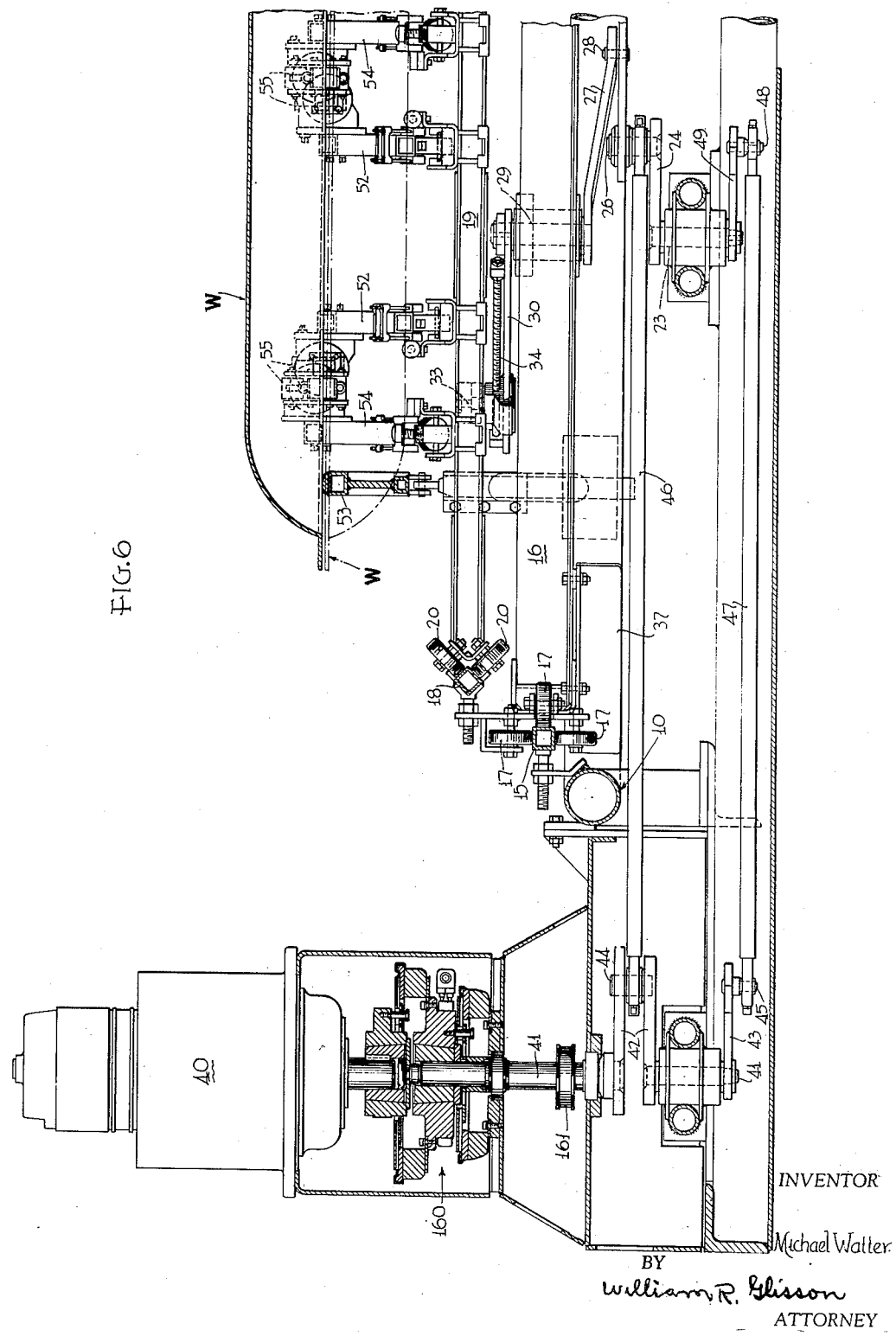

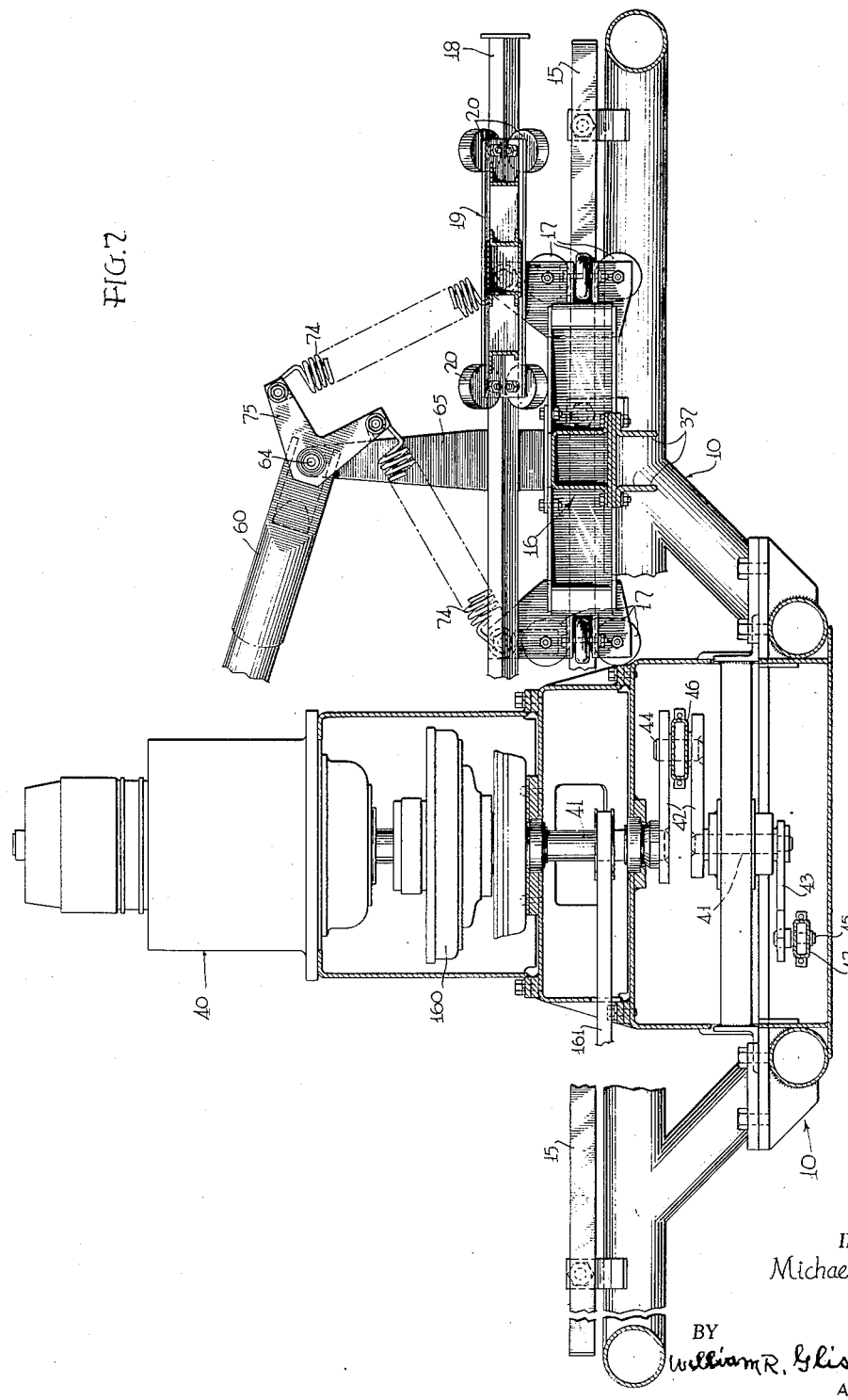

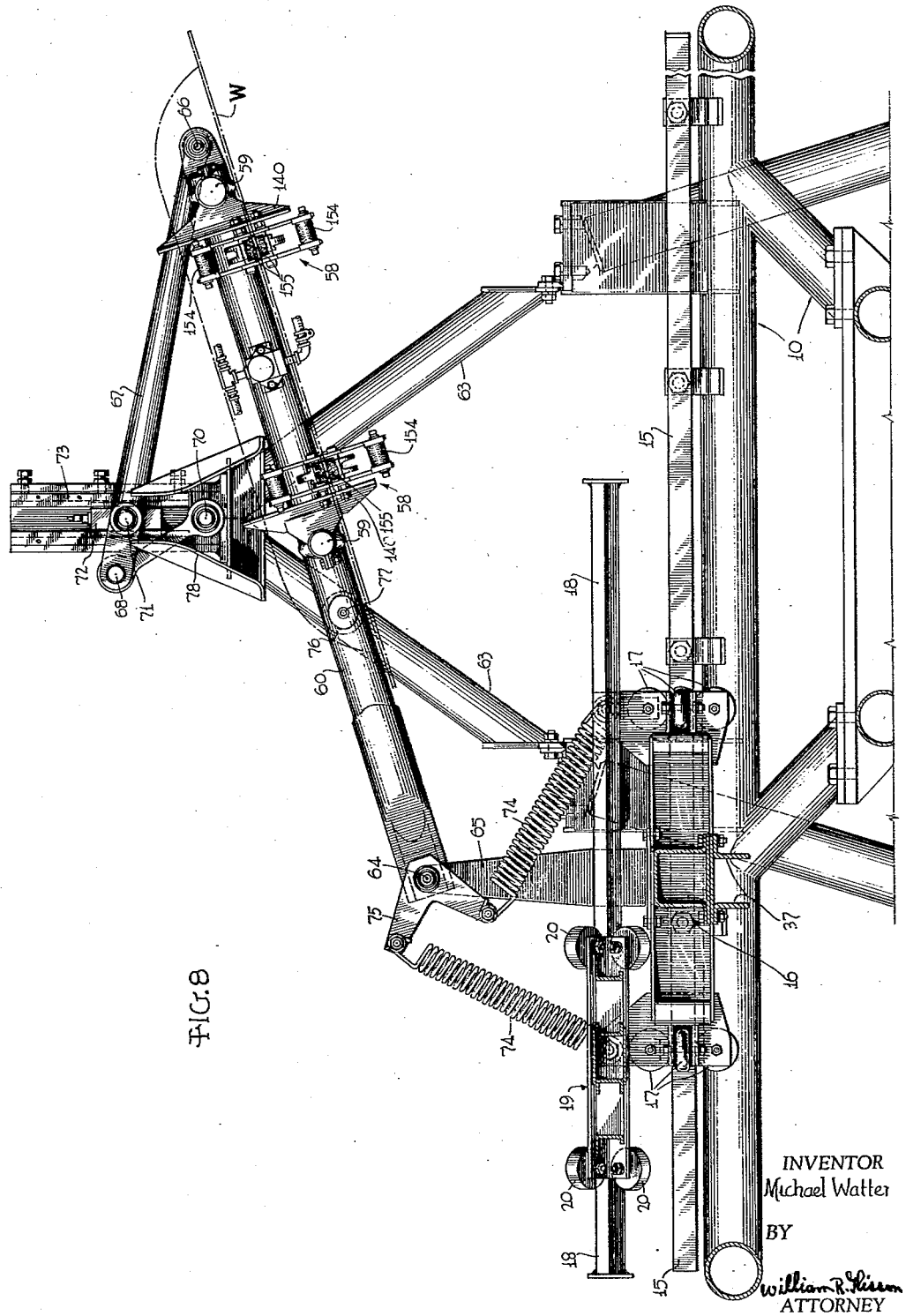

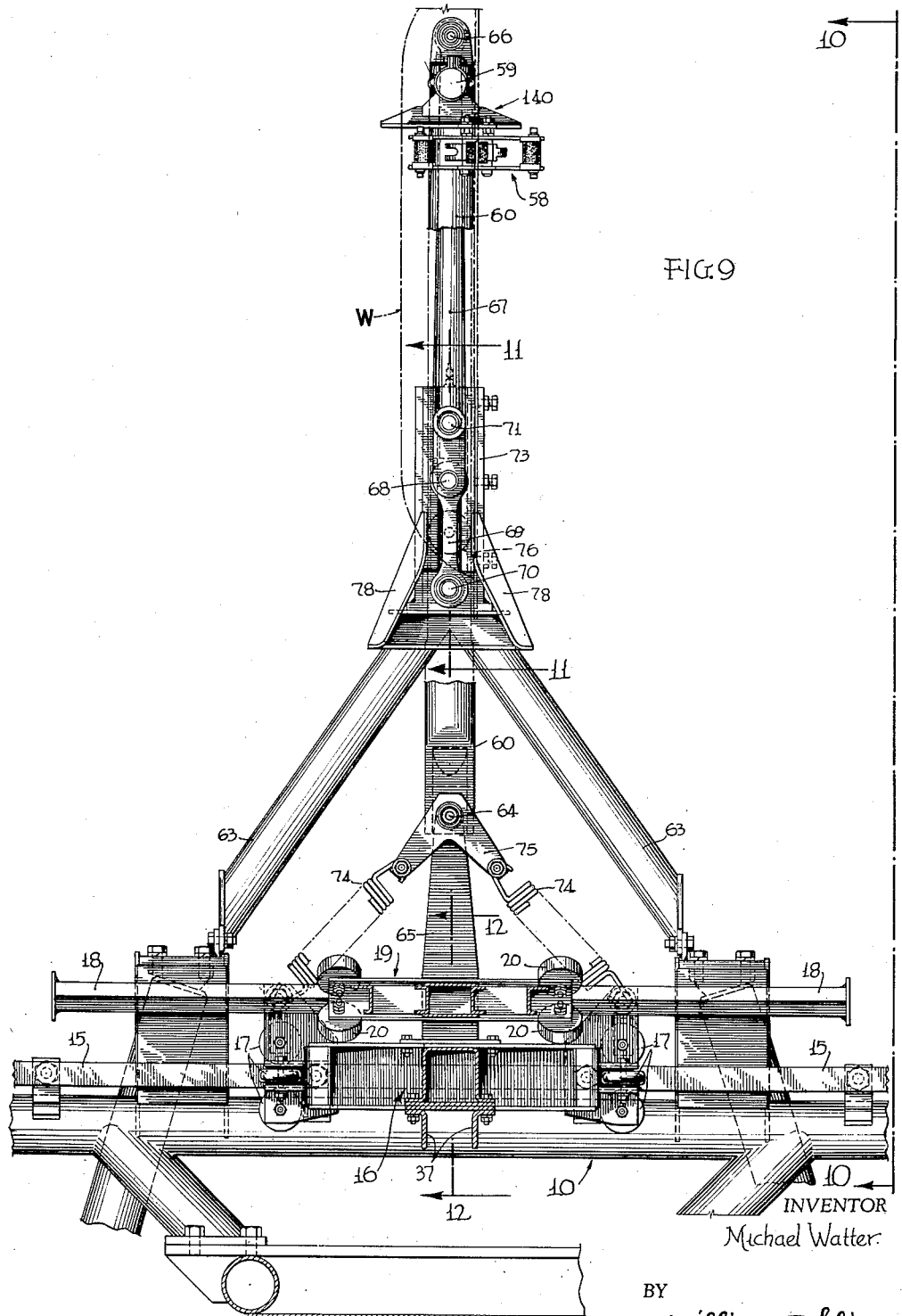

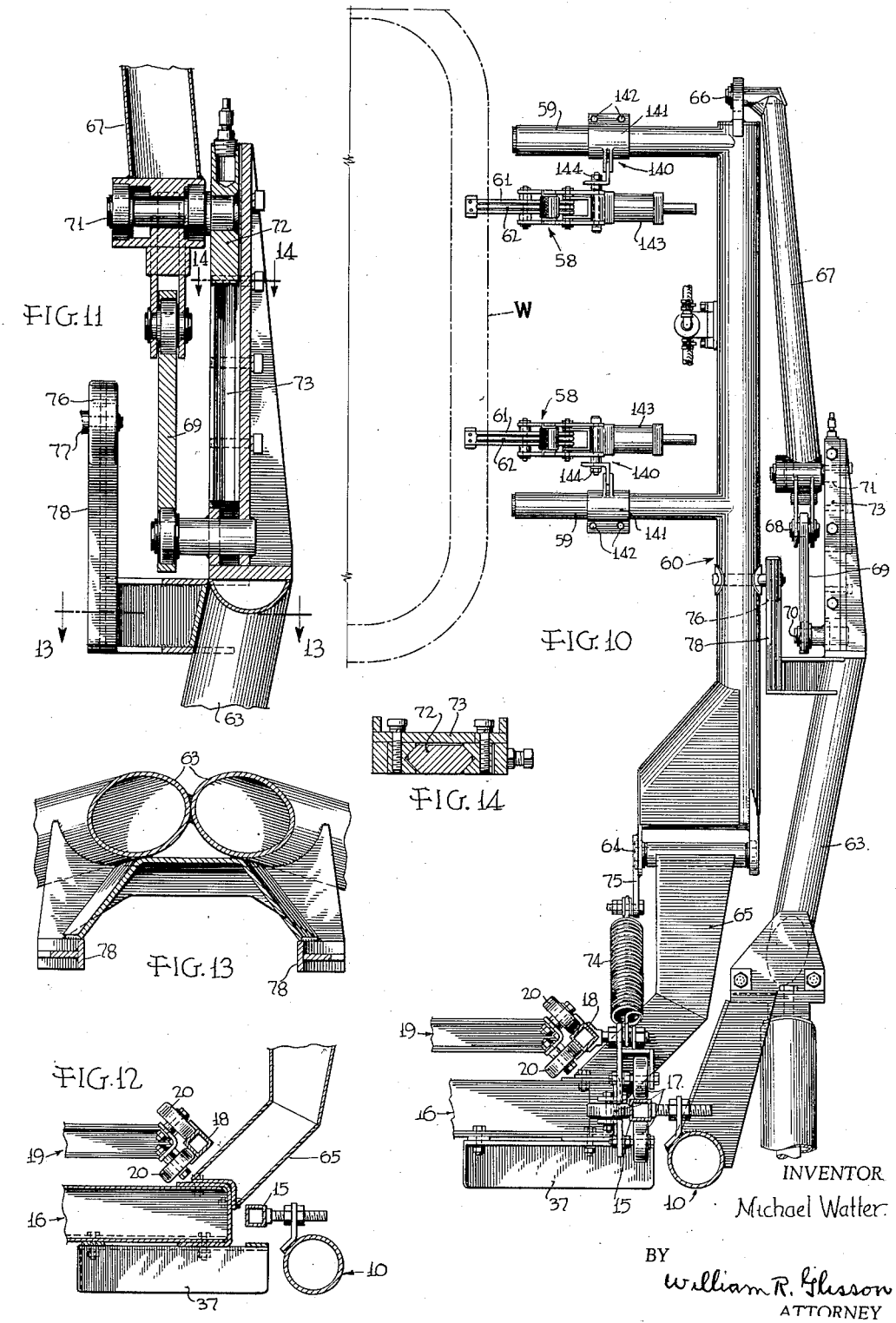

Dec. 10, 1957    M. WATTER    2,815,866
APPARATUS FOR TRANSFERRING ARTICLES
FROM ONE MACHINE TO ANOTHER
Filed Dec. 15, 1954    24 Sheets-Sheet 11

INVENTOR
Michael Watter

BY
William R. Glisson
ATTORNEY

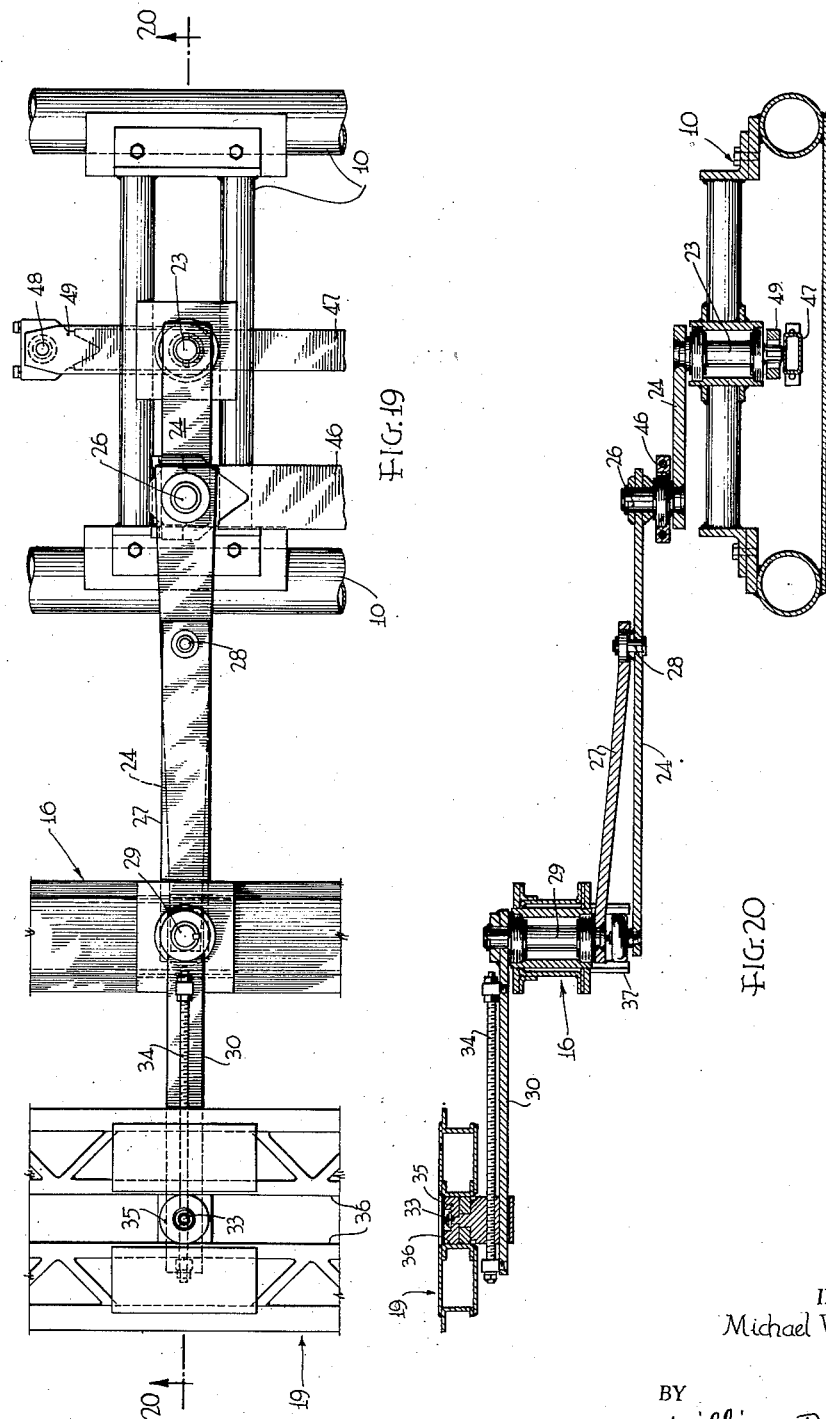

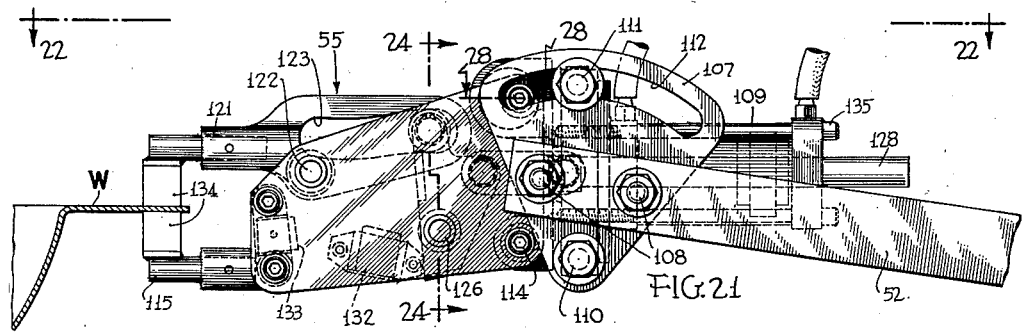

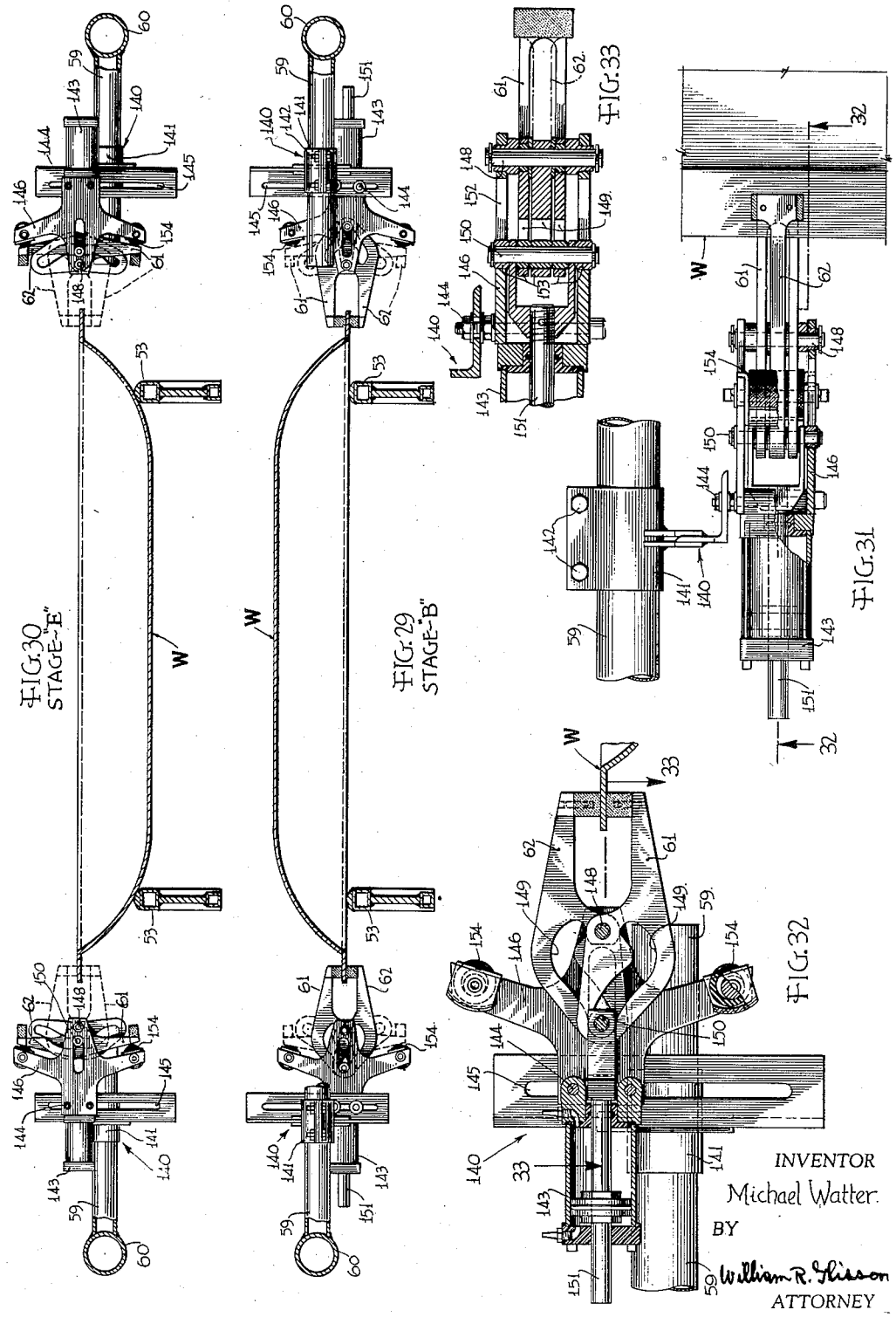

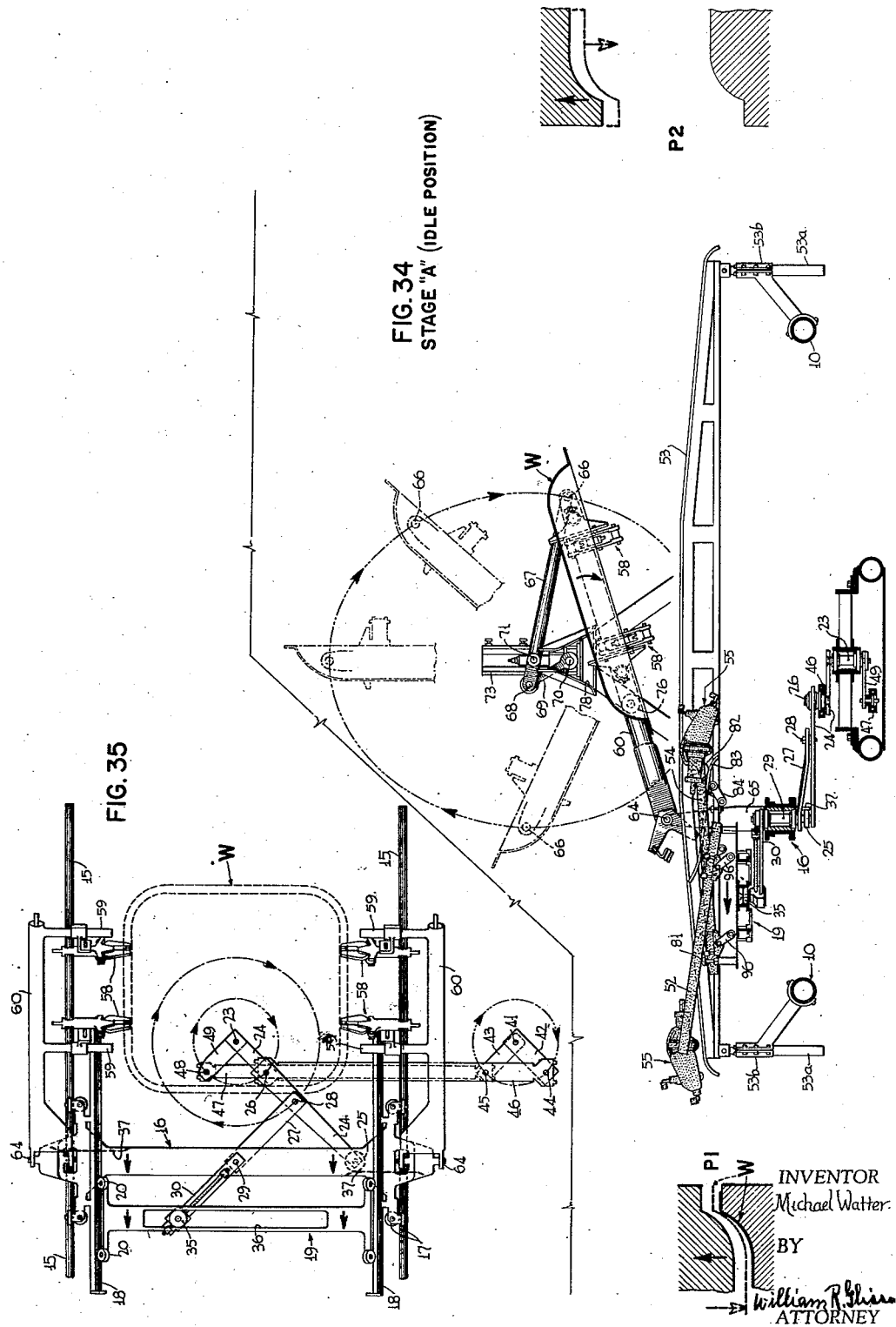

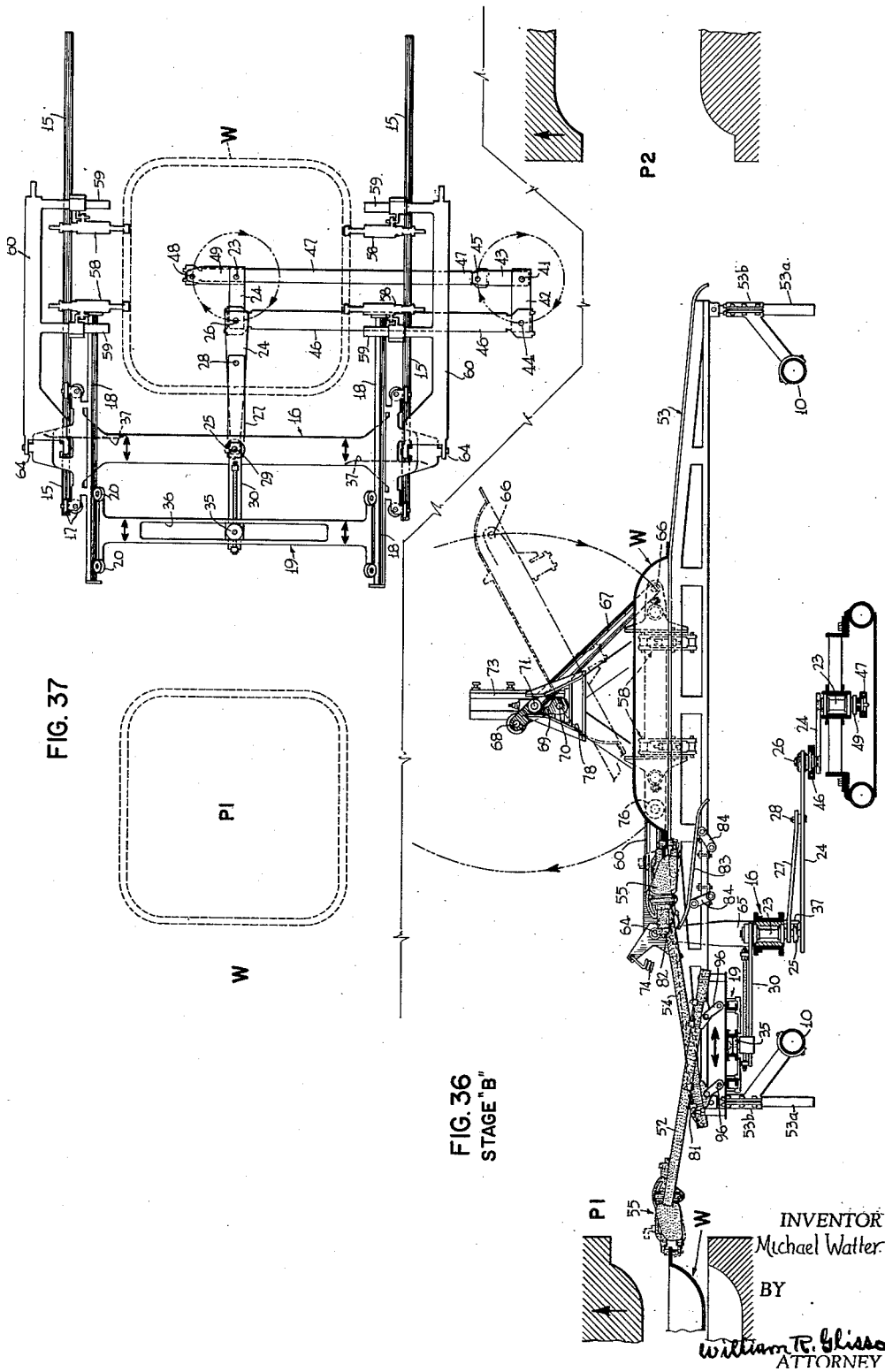

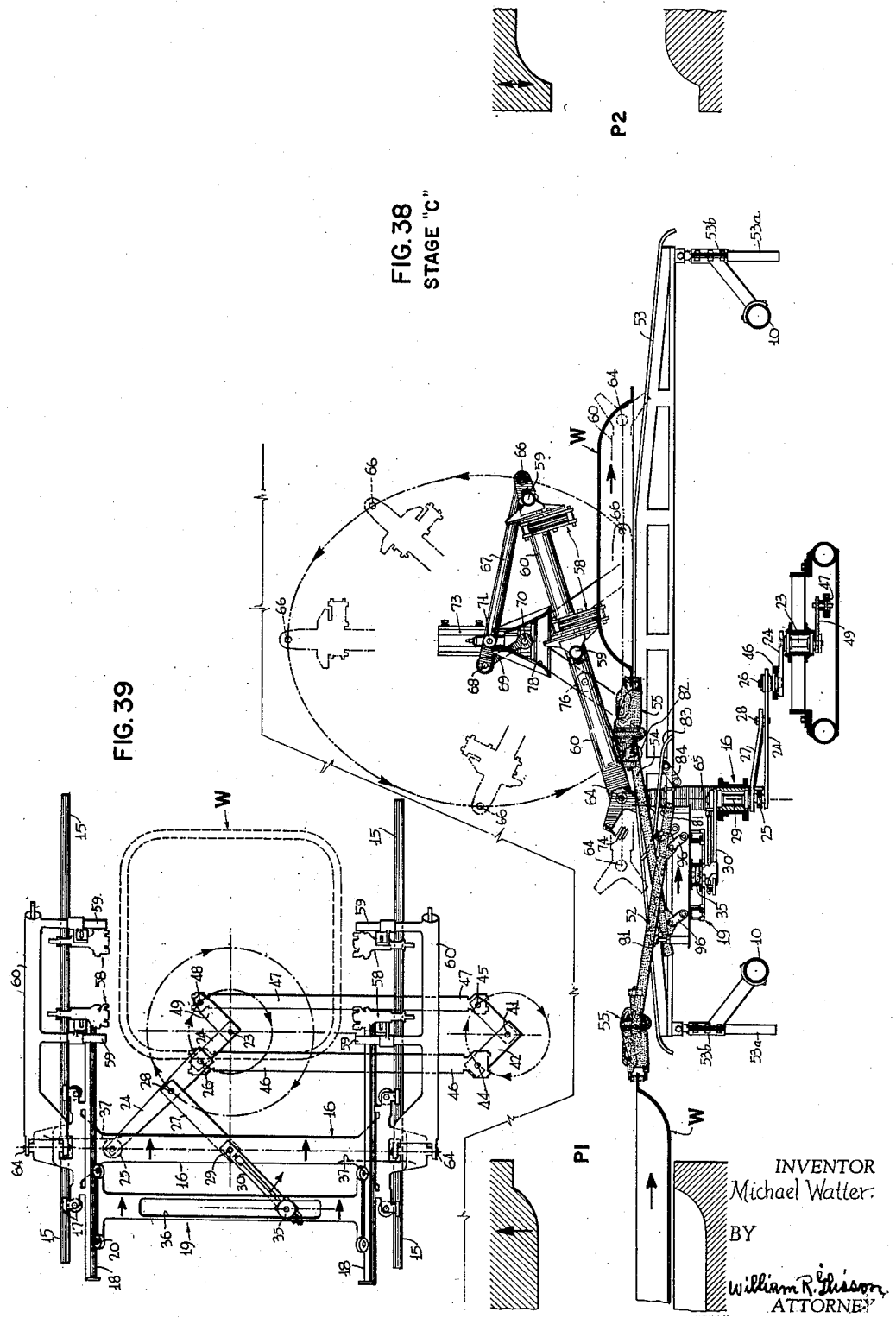

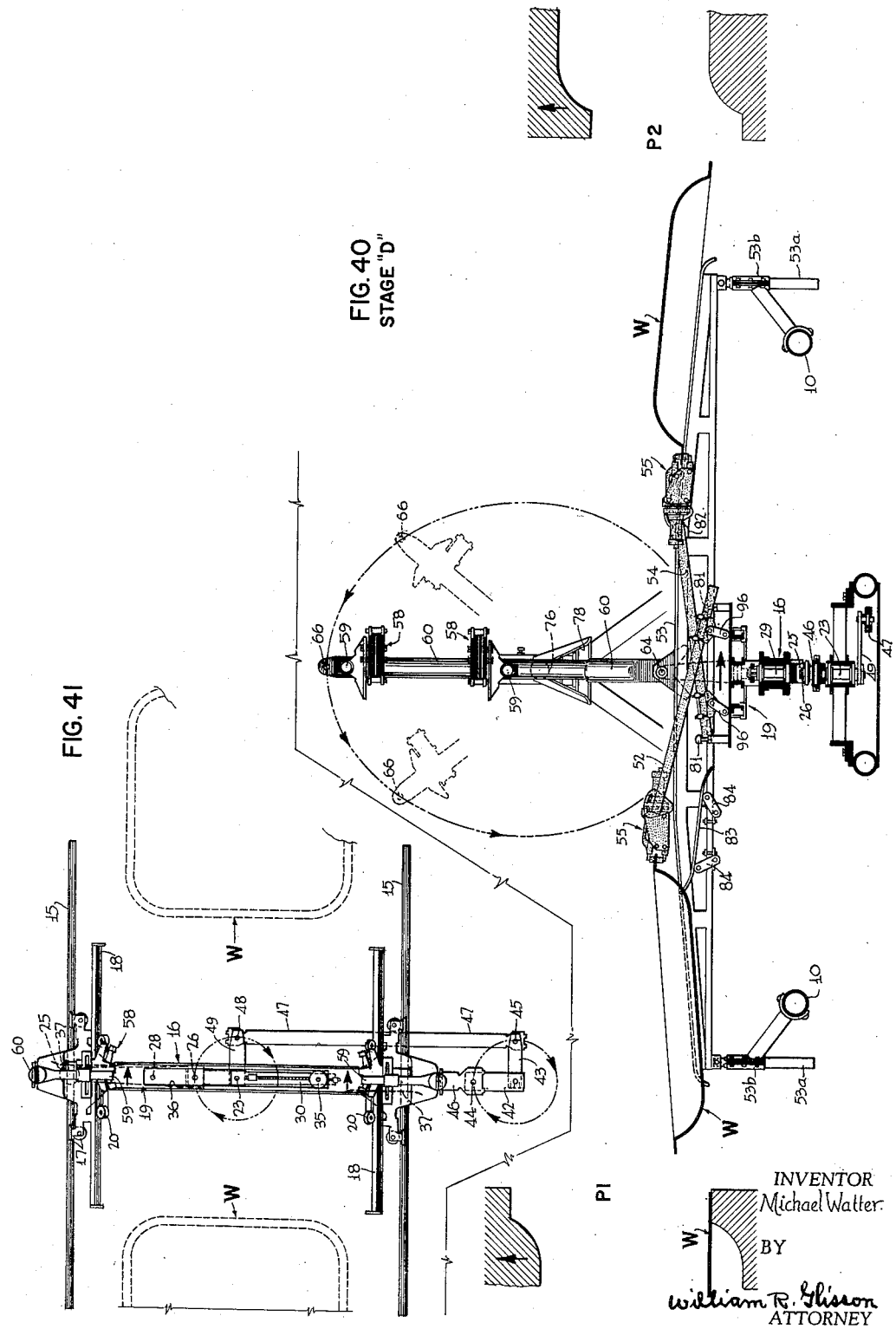

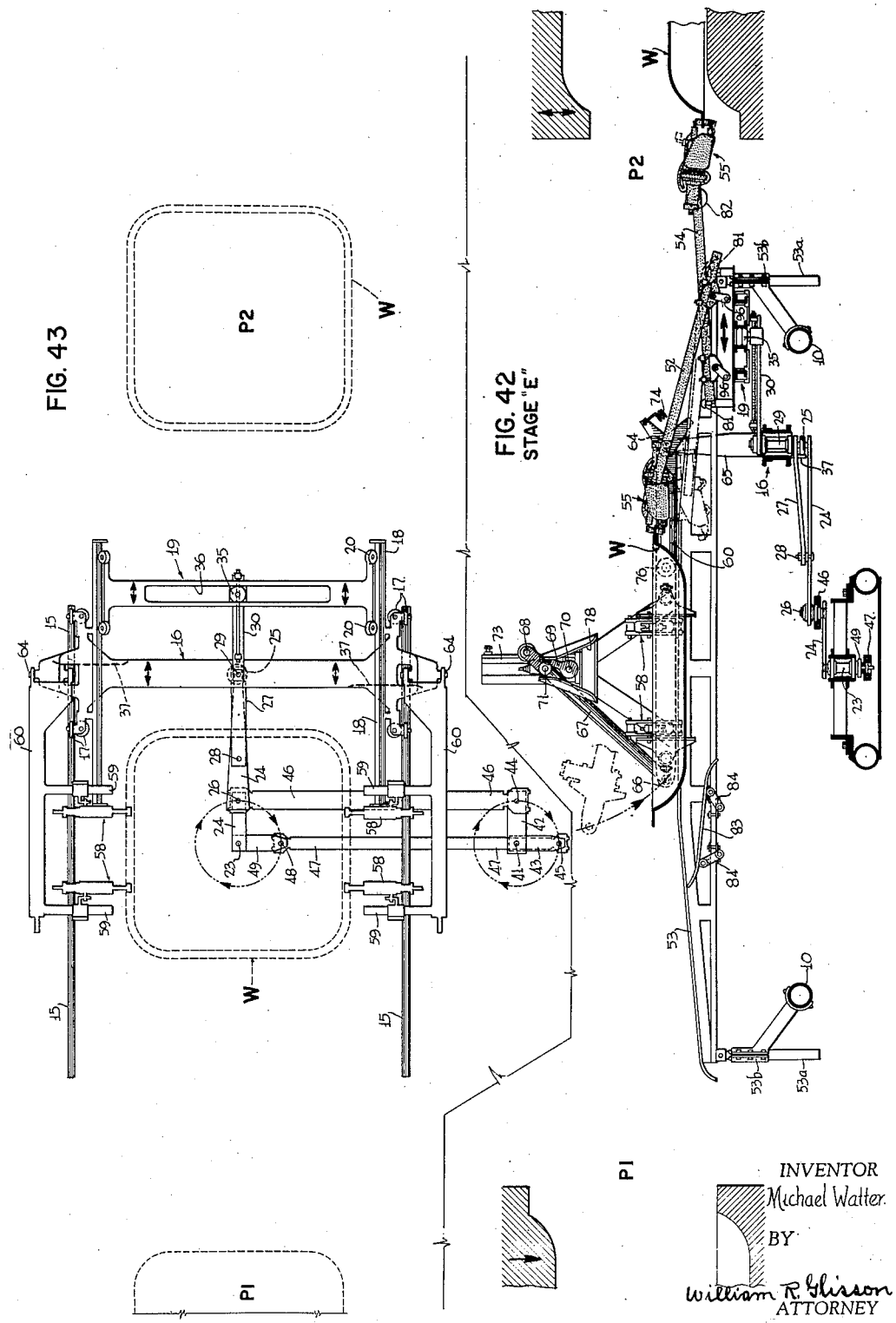

Dec. 10, 1957 M. WATTER 2,815,866
APPARATUS FOR TRANSFERRING ARTICLES
FROM ONE MACHINE TO ANOTHER
Filed Dec. 15, 1954 24 Sheets-Sheet 20
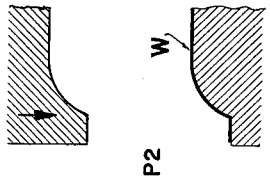
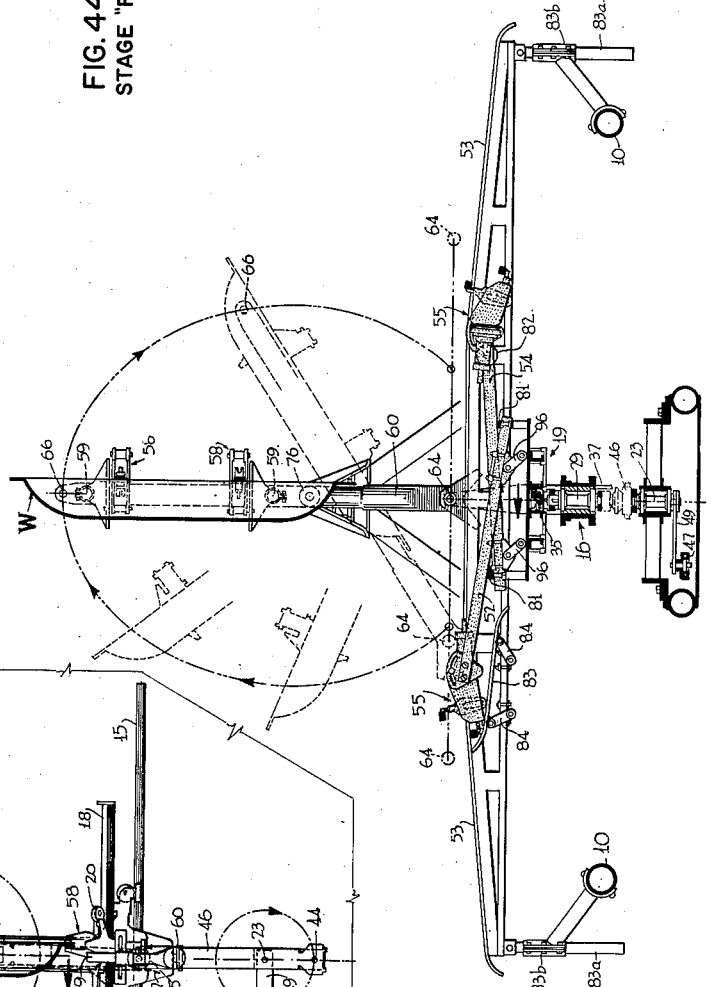
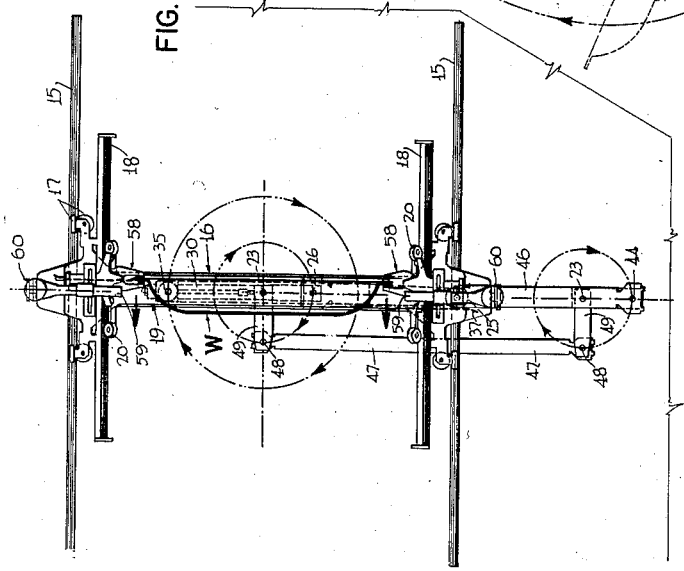
INVENTOR
Michael Watter
BY
William R. Glisson
ATTORNEY

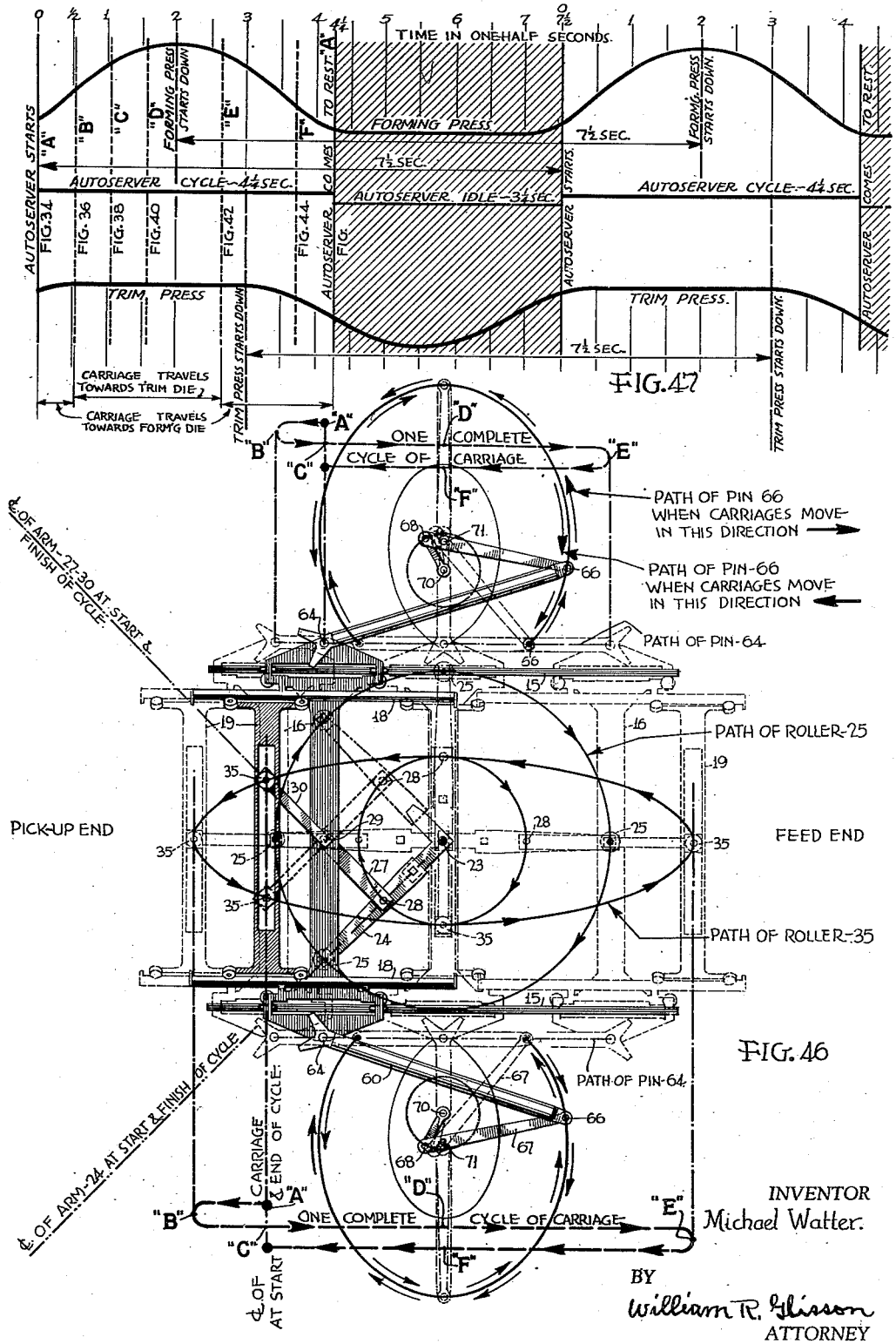

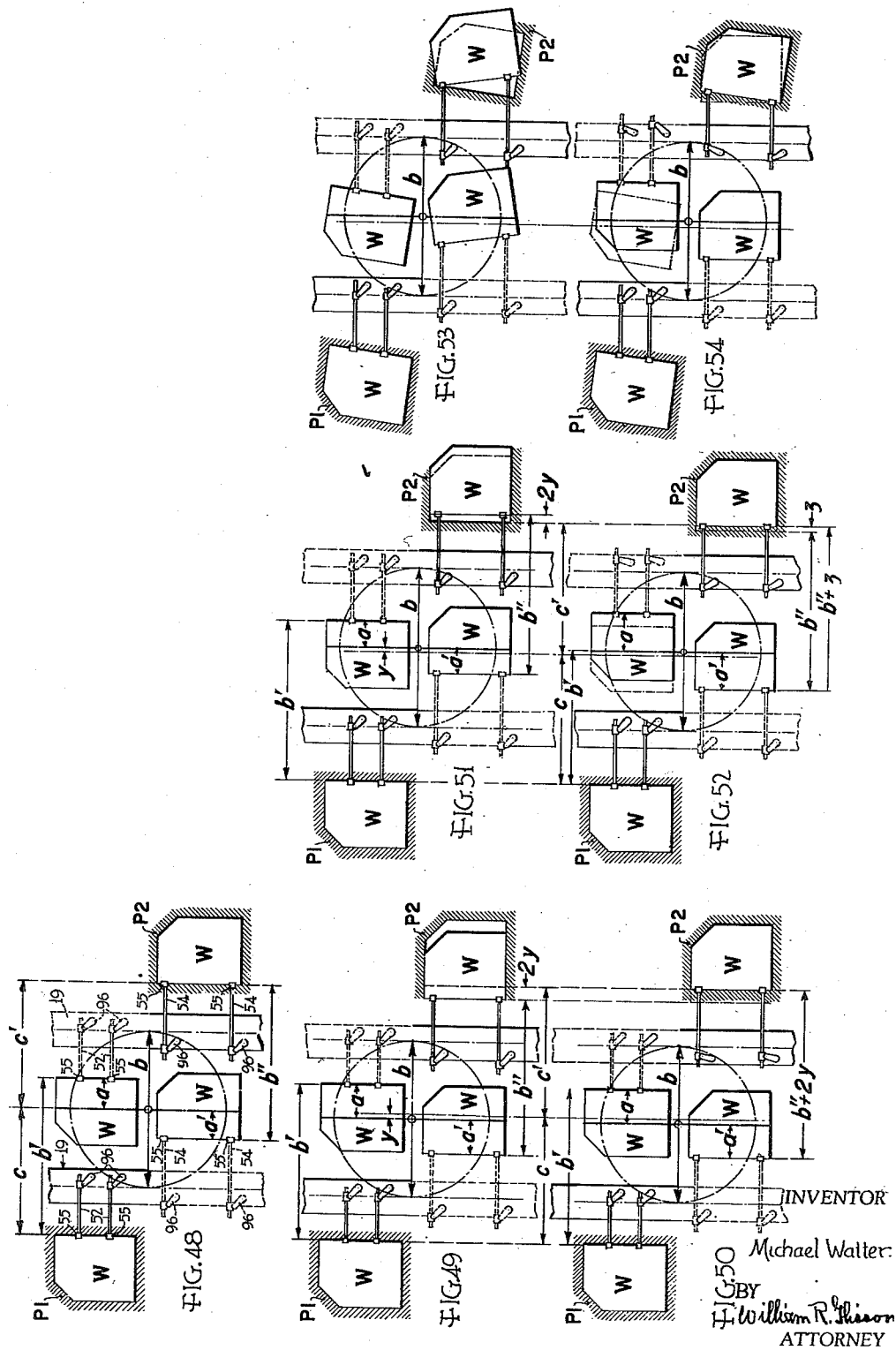

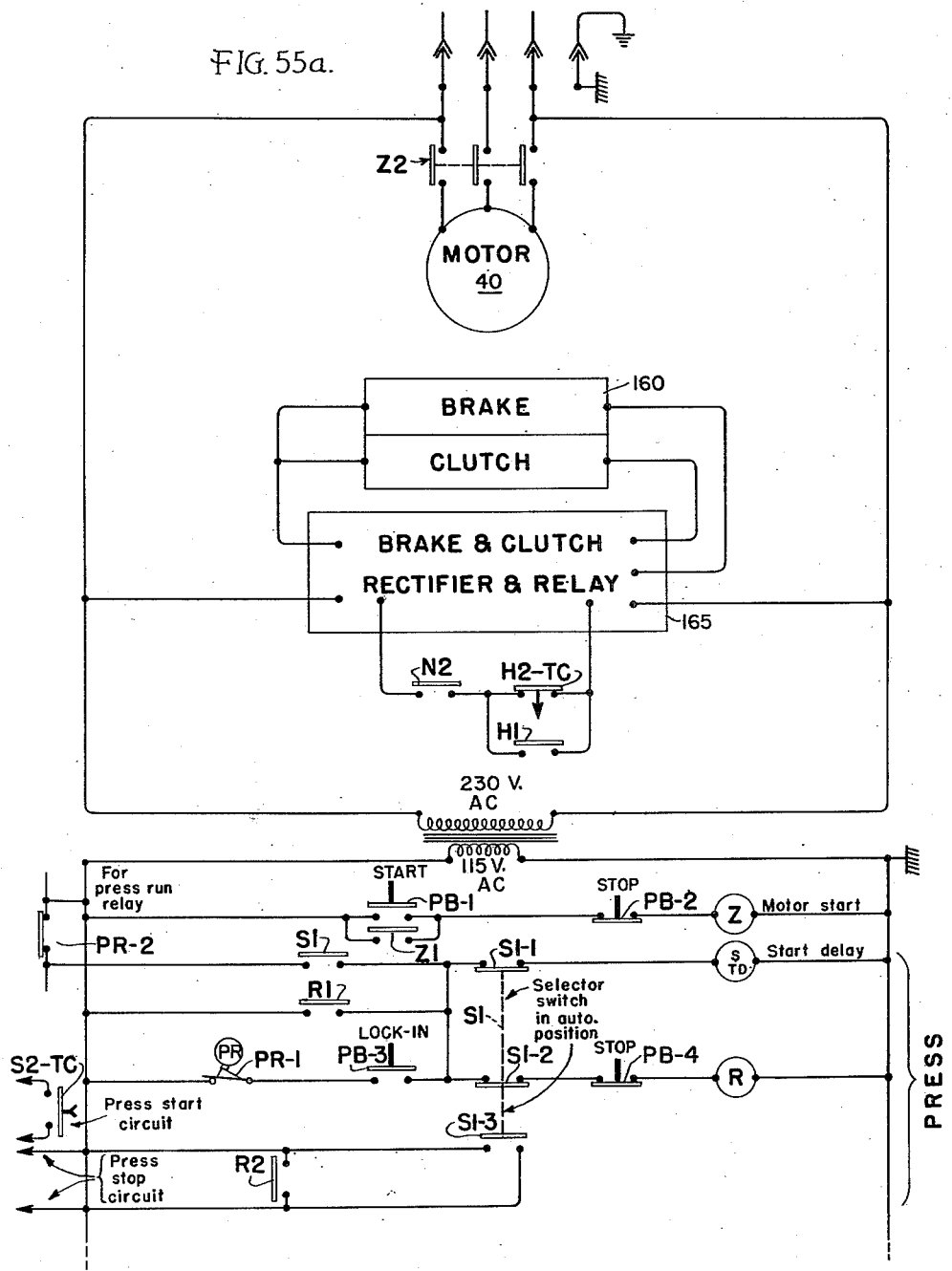

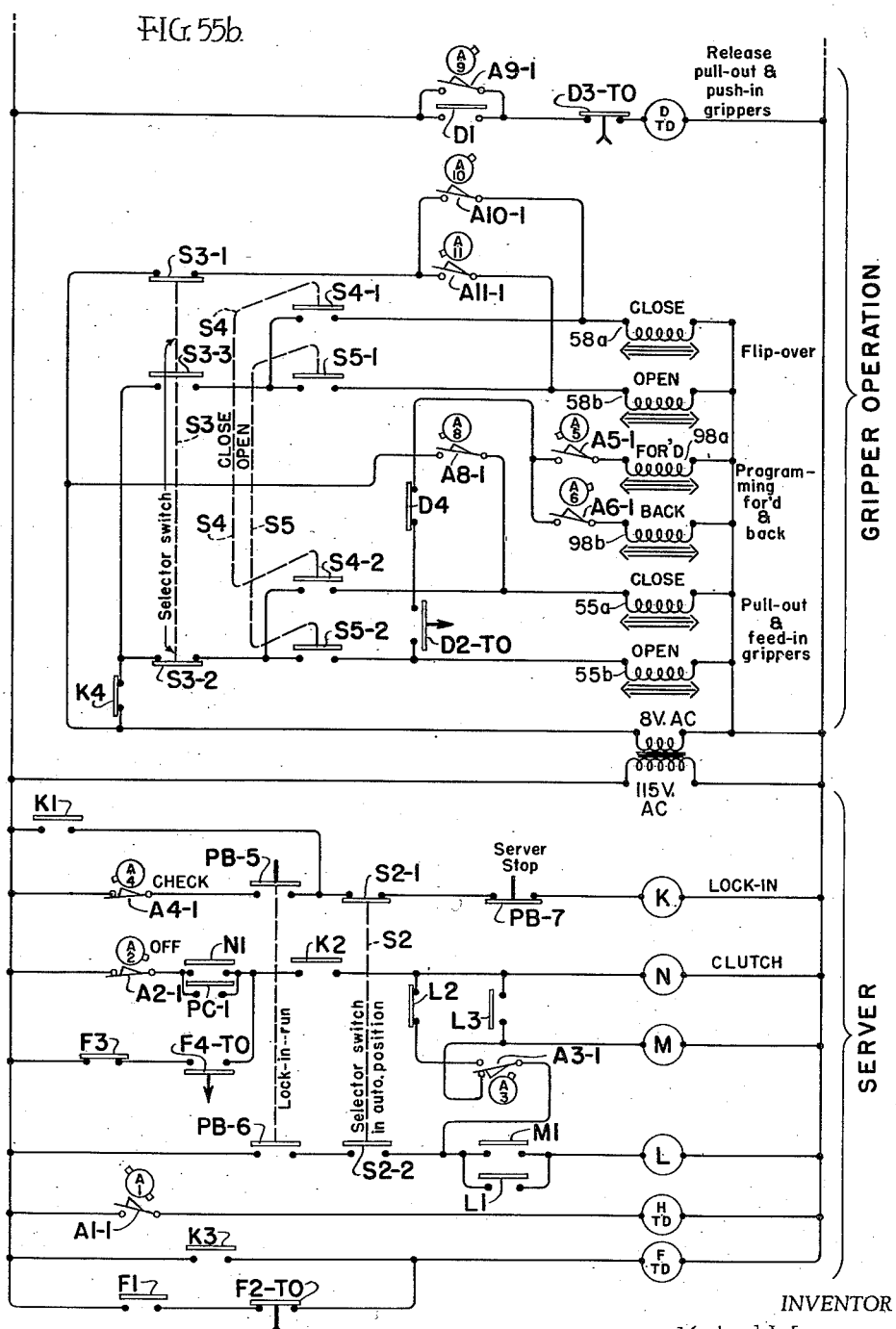

United States Patent Office 2,815,866
Patented Dec. 10, 1957

2,815,866

APPARATUS FOR TRANSFERRING ARTICLES FROM ONE MACHINE TO ANOTHER

Michael Watter, Philadelphia, Pa., assignor to The Budd Company, Philadelphia, Pa., a corporation of Pennsylvania Application December 15, 1954, Serial No. 475,498

13 Claims. (Cl. 214—1)

This invention relates to server or handler apparatus for transferring articles from one machine or position to another and has for an object the provision of improvements in this art.

In many operations, such, for example, as in making stampings for automobile bodies, the workpieces or blanks are subjected to a number of successive operations in successive machines, usually die presses, where progressive shape formation is imparted to them. Sometimes it is necessary to turn the blanks over between stages.

The forming machines work to accuracy and the blanks must be located very precisely in each machine. When the machines are served by hand, the operator can by feel and sight register the articles by indexing pins which enter index holes in the blank.

It is becoming increasingly urgent to handle blanks automatically so as to eliminate manual handling as far as possible. In automatic feeding there is no possibility of adjusting by feel or sight, hence the article must be fed into the machine with great precision in order to fit the locational indexing means. It will be understood the article will be presented, as from a preceding press, to the server in accurate position.

According to the present invention, the required accurate positioning of the blank is accomplished by holding it positively at all stages of its movement from one machine to another. Heretofore when automatic transfer means has been used it has depended on hand positioning in the later acting machine, or has released and re-engaged the blank without holding it in position, or has used transfer means which allowed the article to move out of its required position, or in other ways has opened up the chance that the blank might be fed improperly. Inaccurate feed cannot be tolerated for even a single article because it usually causes the breakage of a very expensive machine.

It is therefore an object of the present invention to provide means for positively holding the article as it is moved in stages from the time it is taken from one machine to the time it is positioned in the next machine.

The required motion of a piece moving between machines is always from and to a stationary or rest condition and its transition through a condition of rapid movement entails inertia forces of acceleration and deceleration which can have damaging effects on the apparatus and pieces and may prevent precision indexing. The present apparatus provides smooth controlled acceleration and deceleration substantially as simple harmonic motion.

According to the present invention the transfer is controlled by a phase of operation of a related machine. Upon the receipt of a starting signal the transfer mechanism starts into action, the article being engaged by one set of holding and moving devices and carried to a given position where it is engaged by another set of holding and moving devices and so on until it is placed in working position in the next machine. Only after a succeeding set of holding devices has engaged the article do the preceding holding devices release it. In this way the article never has any free uncontrolled movement.

The apparatus provided also includes an improved device for inverting the article in cooperation with the action of the transfer carriage. This inverting or flip-over mechanism is designed to give relatively small accelerations with smooth transitions to produce peak power requirements ahead of maximum power required to move the carriages. This factor results in reducing the total power required from the motor. The flipover mechanism is basically symmetrical but is provided with such adjustments that, in cooperation with adjustments on the carriage, a wide range of variation in workpiece location may be achieved, i. e., the workpiece can be made to rotate about a transverse axis equidistant for the front and rear edges or about any of numerous axes which are unequally spaced from the front and rear edges.

The present article handling machine or server is separately powered and operated and is adapted to be inserted between two forming machines for serving them and to be readily removed for repairs or to permit the forming machines to be operated by hand. The forming machines may take the article at different levels. Accordingly, it is an object to provide a server which may readily be adjusted to accommodate for this condition.

The forming machines may be at different distances apart. It is an object to accommodate for this condition.

The article locations in the forming machines may be at different distances from the center of movement of the server. It is an object to accommodate for this condition.

The article locations in the forming machines may be angularly turned relative to each other. It is an object to accommodate for this condition.

The objects and advantages of the invention will be apparent from the following description of an exemplary embodiment, reference being made to the accompanying drawings thereof, wherein:

Fig. 6 is an enlarged partial vertical transverse section taken on the line 6—6 of Fig. 1;

Fig. 7 is an enlarged vertical longitudinal section taken on the line 7—7 of Fig. 1 but showing the drive motor housing of Figs. 4 and 6 in section;

Fig. 8 is an enlarged vertical longitudinal section taken on the line 8—8 of Fig. 1, the parts being shown in a different position from that of Fig. 1;

Fig. 9 is a view like Fig. 8 and taken on the same section line, but with the parts in a different position;

Fig. 10 is a side elevation and section taken on the line 10—10 of Fig. 9;

Fig. 11 is an enlarged partial vertical transverse section taken on the line 11—11 of Fig. 9;

Fig. 12 is a partial vertical transverse section taken on the line 12—12 of Fig. 9;

Fig. 13 is a horizontal section taken on the line 13—13 of Fig. 11;

Fig. 14 is a horizontal section taken on the line 14—14 of Fig. 11;

Fig. 19 is an enlarged plan view of carriage operating parts shown in Fig. 1, but with the parts in a different position;

Fig. 20 is a vertical longitudinal section taken on the line 20—20 of Fig. 19;

Fig. 21 is an enlarged vertical longitudinal elevation and section of a gripper detail, the view being taken on the line 21—21 of Fig. 1;

Fig. 22 is a top plan view of parts shown in Fig. 21;

Fig. 23 is a vertical longitudinal section taken on the line 23—23 of Fig. 22;

Fig. 24 is a vertical transverse section taken on the line 24—24 of Fig. 21;

Fig. 25 is a generally horizontal section taken on the line 25—25 of Fig. 23;

Fig. 26 is a vertical transverse section taken on the line 26—26 of Fig. 23;

Fig. 27 is a vertical transverse section taken on the line 27—27 of Fig. 23;

Fig. 28 is a generally horizontal section taken on the line 28—28 of Fig. 21, some of the parts in front being left out;

Fig. 29 is an enlarged vertical transverse elevation and section of some of the parts shown at the left in Fig. 4;

Fig. 30 is a similar view but showing the parts in a different position in which the workpiece is inverted;

Fig. 31 is an enlarged plan view, partly in section, of parts shown at the left of Fig. 30;

Fig. 32 is a vertical section taken on the line 32—32 of Fig. 31;

Fig. 33 is a horizontal section taken on the line 33—3 of Fig. 32;

Fig. 34 is a diagrammatic vertical longitudinal sectional and elevational view showing the position of server parts at a rest period while associated presses are operating upon stampings, this position being designated as the "A" position;

Fig. 35 is a corresponding plan view;

Fig. 36 is a diagrammatic view like Fig. 34, but showing the parts in another or "B" position;

Fig. 37 is a corresponding plan view;

Fig. 38 is a diagrammatic view like Fig. 34, but showing the parts in another or "C" position;

Fig. 39 is a corresponding plan view;

Fig. 40 is a diagrammatic view like Fig. 34, but showing the parts in another or "D" position;

Fig. 41 is a corresponding plan view;

Fig. 42 is a diagrammatic view like Fig. 34, but showing the parts in another or "E" position;

Fig. 43 is a corresponding plan view;

Fig. 44 is a diagrammatic view like Fig. 34, but showing the parts in another or "F" position;

Fig. 45 is a corresponding plan view;

Fig. 46 is an opened-out cycle diagram to show the movements of various parts;

Fig. 47 is a schematic diagram of the cycle of action of two presses and the server mechanism between them;

Fig. 48 is a plan diagram representing the serving action between two presses under idealistic conditions;

Fig. 49 is a similar diagram showing an underfeed error in longitudinal movement for which the present apparatus is adapted to compensate;

Fig. 50 is a similar diagram showing how the compensation is made;

Fig. 51 is a similar diagram showing an overfeed condition;

Fig. 52 is a similar diagram showing how the compensation is made;

Fig. 53 is a similar diagram showing an angular misalignment condition;

Fig. 54 is a similar diagram showing how the compensation is made; and

Figure 1:
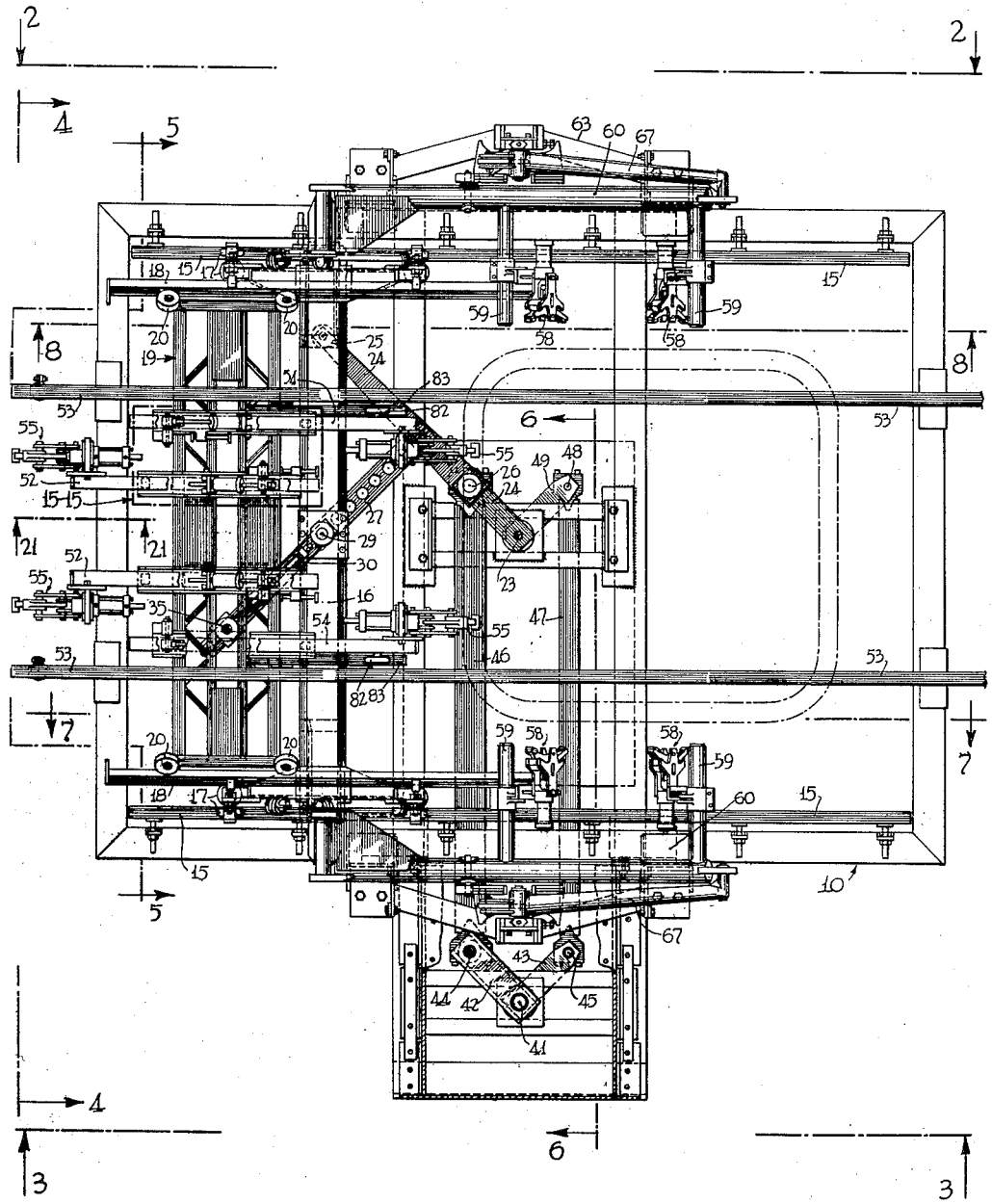
Fig. 1 is a top plan view of a machine embodying the present invention, the drive motor housing being omitted.

Fig. 55, comprised of parts 55a and 55b, is a schematic wiring diagram.

As shown in Fig. 34 and elsewhere, the server of the present invention is adapted to move a blank, workpiece or article W, such as a sheet metal stamping, from one definite location, such as from the dies of a first press P–1, to a second definite location, such as to the dies of a second press P–2. In the present instance the stamping must be inverted and the server is provided with means for doing this. The inverter, however, may be broadly considered as an intermediate holding and positioning means for the workpiece.

The server or transfer apparatus, Figs. 1 to 5, comprises a rigid frame 10, as of metal tubes welded together, mounted on casters 11 for travel to and from operative position as desired and a number of adjustable legs 12 by which the machine can be lined up for use. The casters are mounted on adjustable supports by which the machine can quickly be raised and moved away, leaving the legs at adjusted height so the machine can be immediately set down on them at the same spots on the floor ready for service.

The frame is provided (note also Figs. 19, 20) with spaced adjustable rails 15 along which a first carriage 16 moves on rollers or wheels 17; and the first carriage is provided with adjustable rails 18 along which a second carriage 19 moves on rollers or wheels 20.

The carriage must start from rest, accelerate, and return to rest in moving an article from one position to another and preferably the movement should approximate simple harmonic motion. The mechanism employed herein for this purpose is similar to that shown in my copending application Serial No. 394,397, filed November 25, 1953, now Patent 2,711,101, June 21, 1955, and comprises, Figs. 1, 5–7, 19 and 20, a crankshaft 23 carrying a crank arm 24 having at its outer end a cam roller 25. The arm 24 is made of two parts, as best shown in Fig. 20, which are rigidly connected through a journal pin 26. A connecting rod or link 27 is pivotally connected to the mid-length portion of crank arm 24 by a pin 28 and at its outer end the link 27 is connected to the first carriage 16 by a pin 29. The pin 29 turns in bearings on the carriage but is rigidly secured to the link 27 at its lower end and is rigidly secured at its upper end to a second arm 30. In effect, the link 27 and the arm 30 form one rigid member.

The arm 30 carries a pin 33 which is slidably adjustable on the arm and is moved in and out by a screw 34 to vary the effective length of the arm. The pin carries a roller 35 which operates in a cam slot 36 in the second carriage 19.

The link 27 moves the first carriage 16 near the ends of its stroke and the cam roller 25 on the arm 24 operates on cams 37 at the mid-stroke to carry the carriage past central position. The arm 30 through the cam slot and roller moves the second carriage relative to the first so that the second carriage reciprocates like the first and on the tracks carried on the first but through a longer total distance relative to the fixed axis of the shaft 23.

By this arrangement a very long carriage stroke is achieved by driving mechanism which takes only a small lateral width, all as explained in the copending application referred to.

It is desirable to drive the carriage mechanism by power means mounted outside the zone of movement of the carriage so to this end (Fig. 4) the drive motor unit 40, including gearing, is mounted on one side of the frame and operates a drive shaft 41. As shown in Figs. 1 and 4–6, the shaft 41 carries crank arms 42 and 43 and through crank pins 44 and 45 these crank arms operate driving links 46 and 47 which turn the crankshaft 23, the link 46 being connected to the journal or crank pin 26 and the link 47 being connected to a crank pin 48 carried by another crank arm 49 secured to shaft 23.

Figure 2:
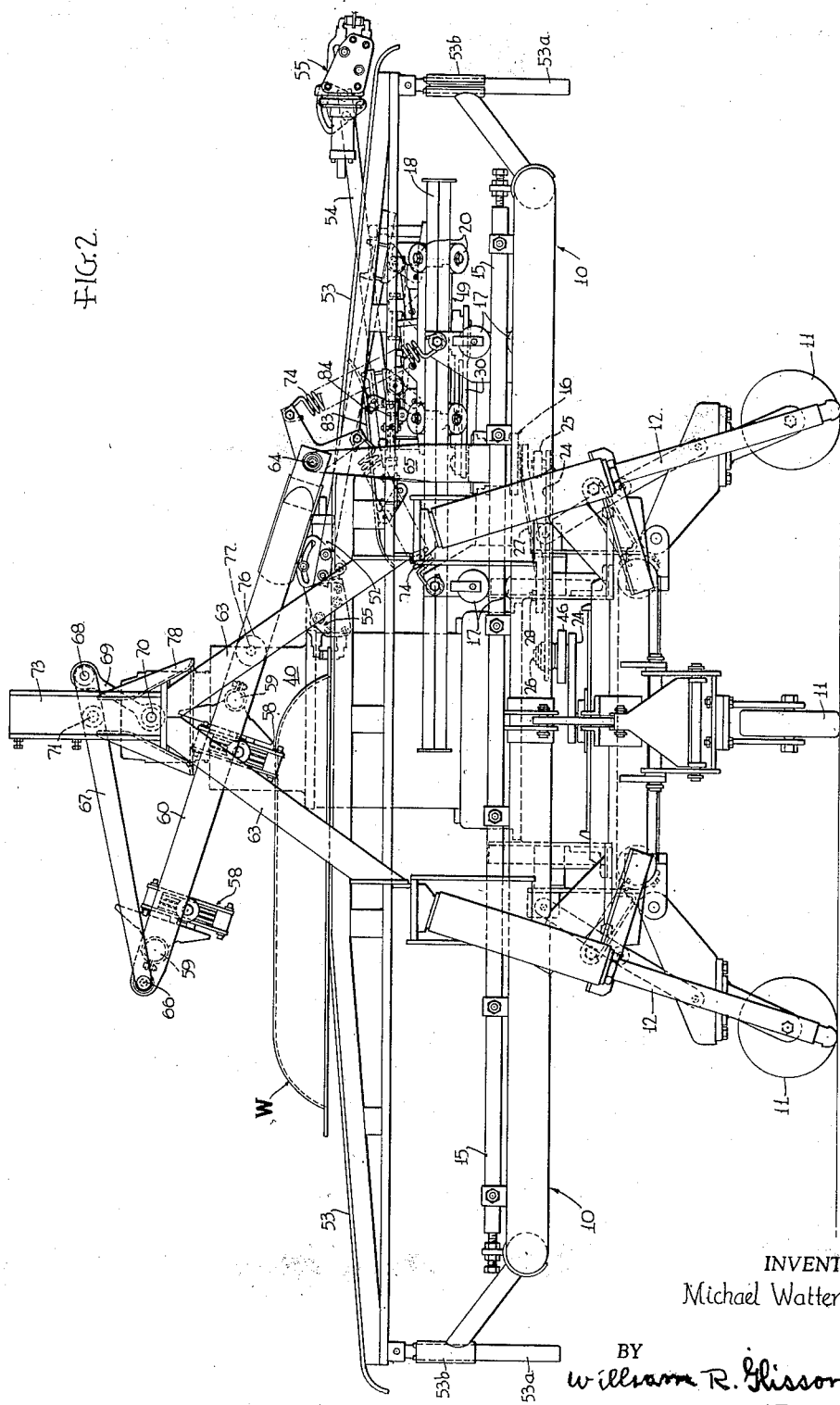
Fig. 2 is an enlarged side elevation taken on the line 2—2 of Fig. 1.
Figure 4:
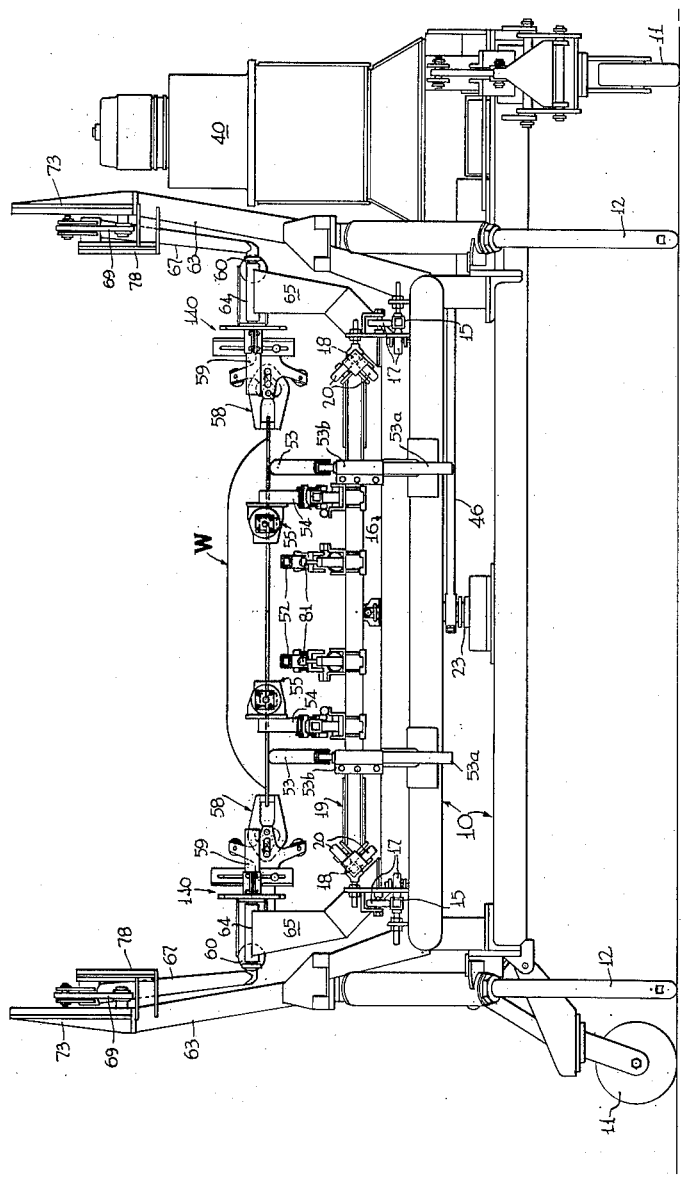
Fig. 4 is an enlarged end elevation taken on the line 4—4 of Fig. 1, the parts being shown in a different position from that of Fig. 1.
Figure 5:
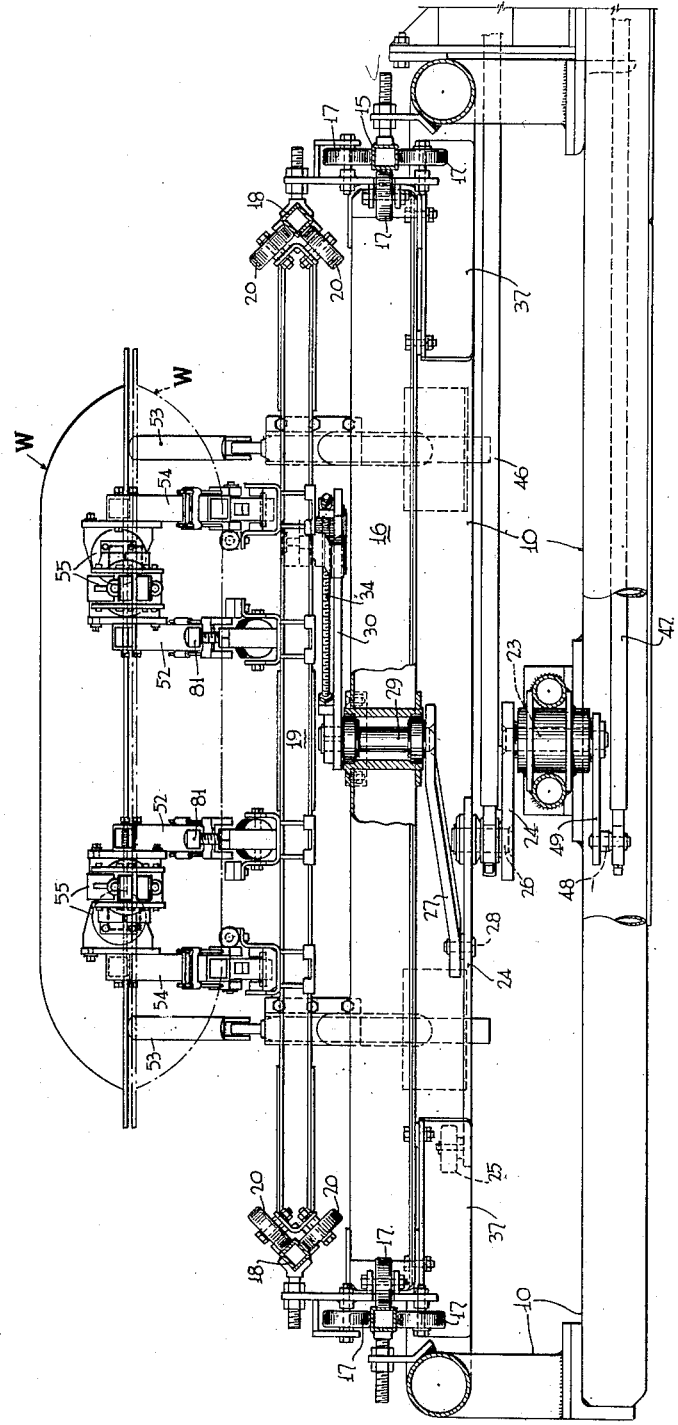
Fig. 5 is an enlarged vertical transverse section taken on the line 5—5 of Fig. 1.
Figure 15:
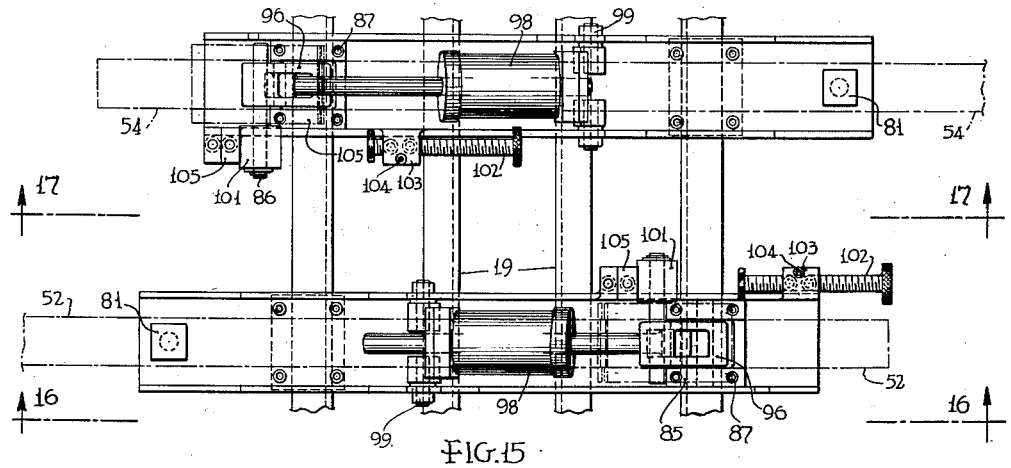
Fig. 15 is an enlarged plan view in the zone 15—15 of Fig. 1.

The carriage carries two sets of gripper arms for moving workpieces with the carriage, one set of two arms 52 for engaging a workpiece in the first press P–1 and pulling it out upon supporting rails 53, and another set of two arms 54 for engaging a workpiece and moving it along the supporting rails 53 to the second press P–2. As shown in Figs. 1, 2 and 4, the rails 53 are mounted for vertical adjustment, having stems 53a carried in split sleeves 53b of the main frame and held by clamp bolts 53c. Bridging rails between the ends of the rails 53 and the presses may be provided if needed for supporting and guiding the workpieces.

The arms carry grippers 55, one of which shown in detail in Figs. 21–28. The jaws of these grippers are of the type in which the upper jaw moves up clear of the edge of the workpiece. It is not necessary for the lower jaw to move.

At the mid-position of the travel of the carriage, that is, at about the axis of crankshaft 23, there is provided a mechanism for inverting a workpiece which has been pulled out of press P–1 by arms 52. As shown in Figs. 8–10, the inverting or flip-flop mechanism comprises grippers 58, a pair on each side, adjustably mounted on stub bars 59 carried by beams 60. The jaws 61, 62 of these grippers, as shown in Figs. 29–33, both moves so as to completely clear the zone along which the workpieces move.

The inverting mechanism is mounted on frame extensions 63 on the sides of the main frame 10 and each beam at one end is pivoted at 64 to a bracket 65 carried by the base carriage 16. At the other end each beam 60 is pivoted at 66 to a connecting rod 67 which at its other end is pivoted at 68 to a link 69. The other end of the link 69 is carried by a fixed pivot pin 70 on the frame extension 63. Near its pivot 68 the connecting rod 67 is provided with a pivot pin 71 which carries a slide 72 which operates in a vertical guide 73 carried by the frame extension directly above the fixed pivot pin 70. As shown in Fig. 46, this arangement produces the movement of parts necessary to place the beams 60 in a horizontal position when the carriage is at the ends of its stroke and to have the movement shown diagrammatically in this figure in order that the movement of parts will be as smooth as possible and take a minimum power peak load on the motor. Springs 74, Figs. 8–10, connected at one end to the ends of a V-shaped projection 75 secured to the end of the beam 60 beyond the pivot 64 and connected at the other end to the carriage 16, assist in controlling the action of the inverting mechanism. Specifically, the springs tend to hold the beam in a vertical position and cause the pivot pin 68 to shift from one side of a vertical line to the other as the carriage moves past central position.

The motion is further controlled, Figs. 8–10, by a roller 76 carried by a pin 77 on the beam 60, the roller moving up into the vertical portion of a fixed Y-shaped guide 78 carried by the frame extension at the mid-point of the stroke. This forces the pin 68 to shift in the right direction from dead center position.

Figure 16:
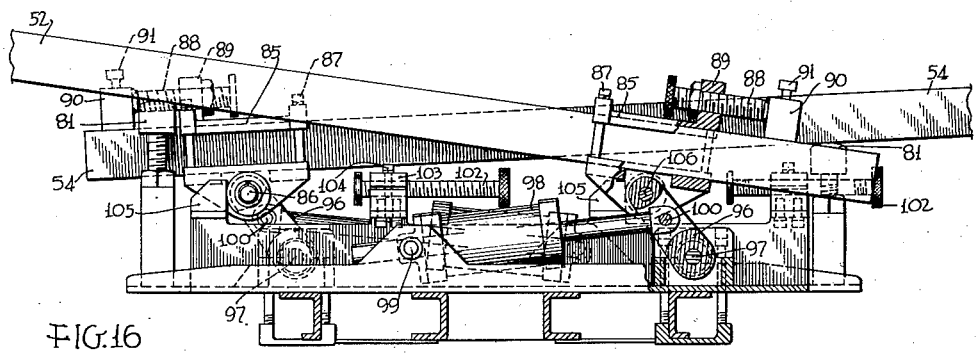
Fig. 16 is an enlarged vertical longitudinal section taken on the line 16—16 of Fig. 15.

As shown in Fig. 2 and in the action diagrams, Figs. 34–45, the supporting rails 53 are low at the ends and higher at the center. As a consequence, the grippers 55 when holding a workpiece stand at a higher elevation at the center than at the ends of the rails. The grippers are held up at the proper height at each end of the rails (Fig. 16) to cooperate properly with the workpieces at the presses by adjustable supports 81 for the arms 52 and 54.

Figure 3:
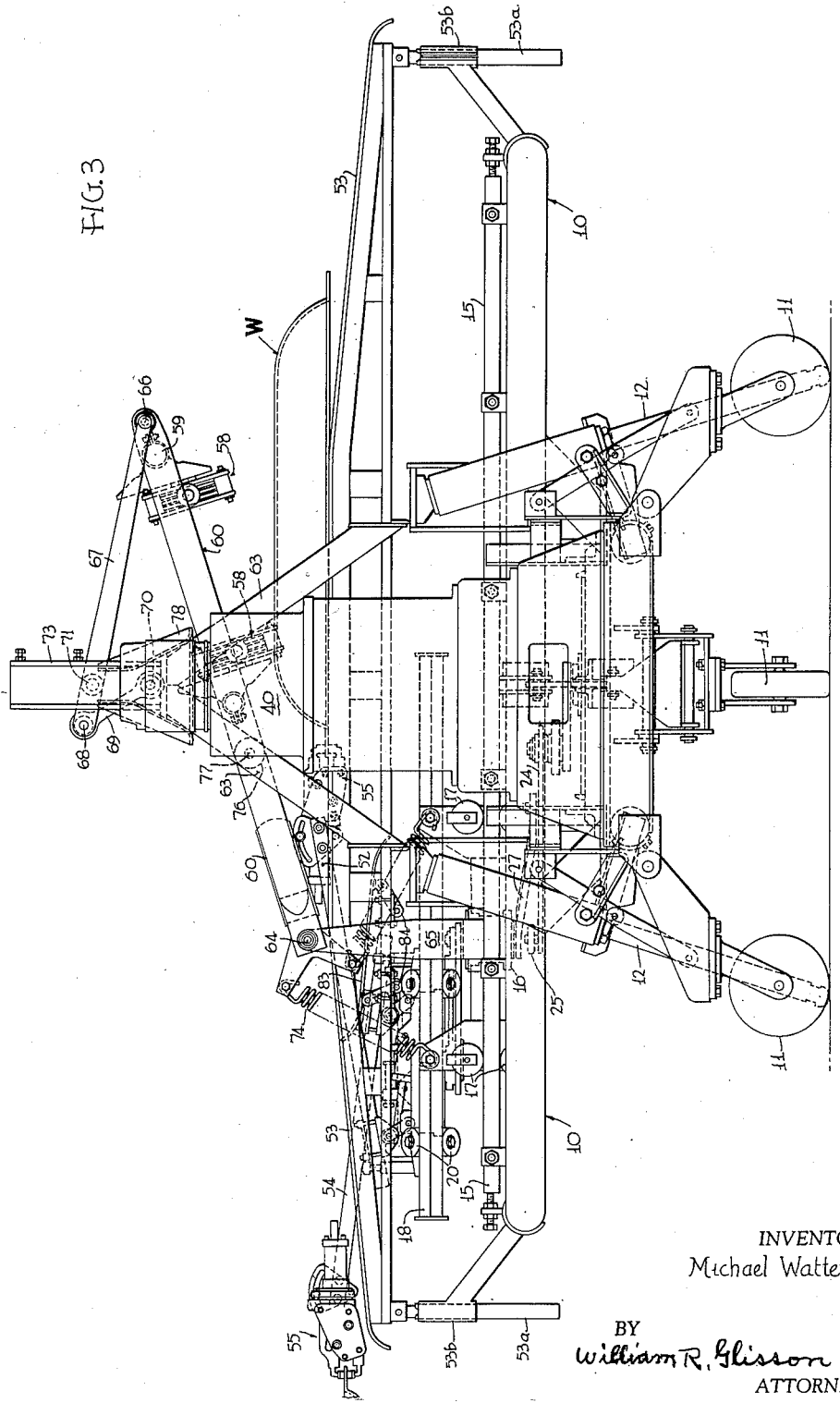
Fig. 3 is an enlarged side elevation taken on the line 3—3 of Fig. 1.

The inverting grippers 58 engage and release a workpiece while it is resting on the rails 53. The grippers 55 of the pull-out arms 52 release the workpiece while it is resting on the rails 53, whereupon the arms 52 drop down upon their supports 81. The grippers 55 of the push-in arms 54 must be raised up to engage a workpiece. For this purpose, as shown in Figs. 1–3, the arms 54 are provided on the side with rollers 82 which ride up on adjustable ramp rails 83 carried on the side of rails 53 by arms 84.

Figure 17:
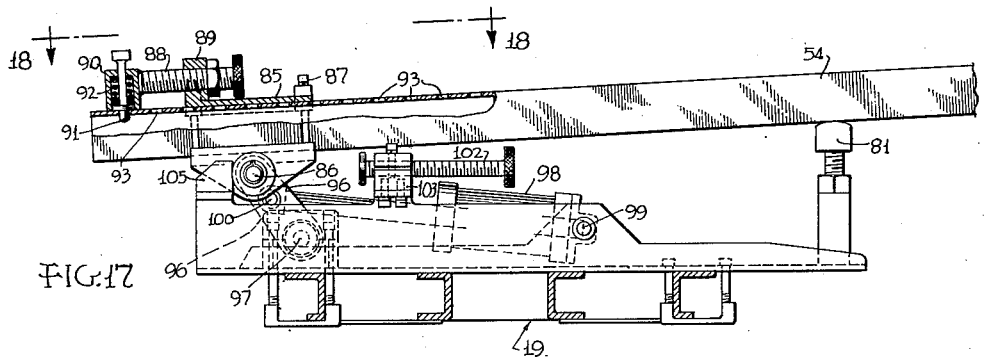
Fig. 17 is an enlarged vertical longitudinal section taken on the line 17—17 of Fig. 15.
Figure 18:
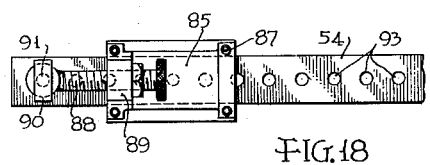
Fig. 18 is a top plan view taken on the line 18—18 of Fig. 17.

Means are provided for adjusting the length of the arms 52 and 54 to accommodate workpieces of different sizes and to cooperate accurately with the edges of the workpieces in the presses. For this purpose, Fig. 17, the arms are carried in yokes 85 which are mounted on pivots 86. The arms are slidable in the yokes and can be clamped in adjusted position by set screws 87. Means are provided for moving the arms in their yokes, the means here shown including an adjusting screw 88 threaded in an upstanding projection 89 of the yoke and a holding block 90 in which the end of the screw 88 is turnably and nonslidably connected. The block 90 has a detent pin 91 urged downward by a spring 92 and adapted to enter one of a series of holes 93 in the arm.

While the handler is normally set up with its center of movement (axis of shaft 23) at the mid-point between presses and the length of movement is made to equal that required to exactly carry a workpiece from its proper position in one press to its proper position in the other press, it is not always possible to obtain this relationship or to retain it even if it is obtained initially, due to changing or adjusting dies and the like. Means are therefore provided for changing the length of movement of the pull-out and push-in arms independently of the movement of the carriage. The compensating means provided for this purpose will be referred to as the programming mechanism.

As shown in Figs. 15–18, the pivots 86 of the arm yokes 85 are carried by arms 96 mounted on pins 97 carried by the carriage. The arms 96 are adapted to be swung by power means, here shown as fluid-actuated piston-cylinder devices 98 connected at one end to a fixed pivot pin 99 and connected at the other end by a pivot pin 100 to an intermediate point on the arms 96. The arms 96 at their outer ends on the side carry stop projections 101 which are adapted to strike the end of adjustable stop screws 102 mounted in fixed brackets 103 and locked in adjusted position by set screws 104. In the rest position the projections 101 engage fixed stops 105 provided on the carriage. The function of this supplemental motion producing mechanism will be explained in connection with Figs. 48–54.

The grippers 55 of the pull-out arms 52 and the push-in arms 54 are shown in Figs. 21–28. The one shown is for an arm 52. The gripper is adjustably mounted on the arm so it can be moved to engage the edge flange of a workpiece at different heights. For this purpose the arm is provided with a plate 107, the plate and arm being secured together by bolts 108.

A clamp ring 107a for holding the cylinder-piston device 109 is pivotally mounted on a bolt 110 carried in the plate 107 and a bolt 111 extending from the side of the clamp ring extends through an arcuate slot 112 of the plate. When the bolt 111 is tightened the cylinder and related parts are held in such adjusted position as they have been set.

A gripper frame 113 is pivotally mounted on a pin 114 carried by the cylinder, the frame at its front end carrying the lower jaw 115 of the gripper. Some free movement is provided for the frame 113 and the relatively fixed lower jaw 115 by providing a pin 116 in the upper part of the frame and positioning it in an oversized hole 117 in a part carried by the cylinder. The pin has a resilient sleeve 118, as of rubber or nylon, to cushion the action of the pin in the hole.

The movable jaw 121 is mounted on a pivot pin 122 carried by the frame 113 and has a slot 123 in its rear extension in which operates a pin 124 of an actuating bellcrank lever 125 pivoted on the frame 113 at a pin 126. The pin 124 is provided with a wear sleeve 127 operating in the slot. The lever 125 is actuated by a piston rod 128 through a connecting link 129, pivoted to the rod by a pin 130 and pivoted to the lever by a pin 131. Resilient guides and friction elements 132 are provided for holding the movable jaw in open position. A resilient stop 133 is provided for limiting the opening movement of the jaw. The jaws have resilient gripping elements 134 of a tough long-wearing material such as nylon.

The ring 107a operates in an annular recess between parts which are held in assembly by bolts 135 which hold the cylinder to its frame and a wear sleeve 136 is interposed between the ring and its seat. A clamp bolt 137 in the ring holds the cylinder and related parts in such position as they may be turned.

The grippers 58 for the inverter or flip-flop mechanism are shown in detail in Figs. 29–33. As stated, the jaws must both be opened to clear the workpiece and the mounting provides various adjustments for engaging a workpiece edge flange at different heights and inclinations and of workpieces of different widths.

The round stub bar 59 has mounted upon it a frame 140 having a split sleeve 141 mounted for endwise and turning movement on the bar and held in adjusted position by clamp screws 142. A cylinder-piston device 143 has bolts 144 which enter a slot 145 of the frame 140 whereby the cylinder-piston power device and gripper jaws carried thereby may be held at various heights when the bolts are tightened. The cylinder-piston device 143 carries a frame 146 to which the jaws 61, 62 are pivoted each by a pin 148. The rear ends of the jaw members are provided with slots 149 in which operates a pin 150 carried by the end of a piston rod 151. The frame 146 has slots 152 which guide the outer ends of the pin 150 and wear sleeves 153 are pressed on the pin to cooperate with the several slots. The jaws strike resilient stops 154 in their outer or open position. The jaws are provided with tough resilient pads 155 for engaging the workpieces without marring them.

As shown in Fig. 6, the drive motor unit 40 includes a clutch-brake device 160 adapted to be operated remotely, as by a control circuit. There is also a positive belt drive 161 for a control cam shaft, not shown. It is merely necessary to know that the cam shaft is positively driven at the same speed as the crankshaft and that it maintains a fixed angular relationship to the crankshaft.

The action through one cycle of operation is shown in Figs. 34–45.

Figs. 34 and 35 show the rest or pause position, referred to as position "A" while the presses are acting on workpieces. Here a workpiece is held by the gripper jaws of the inverting mechanism and the pull-out and push-in grippers are open. As shown in Fig. 35, the carriage is near the left end of its stroke but not near enough for the pull-out grippers to interfere with the action of the press. It will be noted that the upper dies of the presses P–1 and P–2 are rising to free the space in the presses for movement of the workpiece. The carriage crank arm (Fig. 35) is in about the 45° position midway between the central and end position. This is an easy starting position since both the cam and link mechanisms are acting on the carriage at this time.

In Fig. 47 the vertical movement of the forming press P–1 and the trim press P–2 and the angular movement of the server are plotted against time. Fig. 46 shows the paths of movement of various parts of the server through one cycle of operation.

Figs. 36 and 37 show the position of parts at the "B" stage where the carriage has moved to the extreme end of its movement toward the forming press P–1. This will be referred to as the zero degree (0°) position and position "A" will be referred to as the minus forty-five degree (−45°) or three hundred and fifteen degree (315°) position with respect to the movement of the carriage crankshaft. In Fig. 36 the workpiece has been raised in the press P–1 and the grippers of pull-out arms 52 have just grasped the edge of the workpiece. The inverting mechanism has inverted the previous workpiece and holds it at the rails. The inverter grippers 58 have released the workpiece and the grippers of the push-out arms 54 have just grasped the flange at the trailing edge. The workpiece is at rest and the inverter grippers still hold it when the push-out grippers grasp it, the inverter grippers then immediately releasing it. It can be seen in Fig. 36 how the pull-out grippers and the push-in grippers are held up in proper position by their arms to match the height of the edge of the workpiece.

Figs. 38 and 39 show the position of parts at the "C" stage where the carriage crankshaft is at about the plus forty-five degree (+45°) position. Here the pull-out and push-in grippers are moving workpieces along and the inverter mechanism is starting to move back empty with jaws open to prepare for taking a new workpiece.

Figs. 40 and 41 show the position of parts at the "D" stage where the carriage crankshaft is at the ninety degree (90°) position and the carriage is passing over the axis of the crankshaft. The pull-out and push-in grippers are still moving workpieces along and the inverter is still turning back with the beams 60 in vertical position.

Figs. 42 and 43 show the position of parts at the "E" stage where the carriage crankshaft is at the one hundred and eighty degree (180°) position and the carriage is at the end of its stroke toward the press P–2. The grippers of the push-in arms are just ready to open and drop the workpiece in the press and the grippers of the pull-out arms are just ready to open and release the new workpiece to the inverting mechanism, the grippers of which have just grasped the edge flange of the new workpiece. The beams 60 are in horizontal position and inverted relative to their position in Fig. 36 where they released the previous workpiece.

Figs. 44 and 45 show the position of parts at the "F" stage where the carriage crankshaft is at the two hundred and seventy degree (270°) position and the carriage is at its mid-position on its return stroke. The pull-out and feed-in grippers are open on the return stroke. The inverter beam is vertical at mid-position with the workpiece securely gripped and being inverted.

When the server parts return to the "A" position at three hundred and fifteen degrees (315°) they halt while the presses operate upon workpieces, as shown in Fig. 47.

In the above description of operations it has been assumed that the center of movement of the carriage coincided with the mid-point between the die positions of the presses and also that the press dies were in accurate angular alignment with the line of movement of the workpiece in the server. It is hard to maintain this ideal condition because dies must be adjusted and changed and other factors tend to disrupt the ideal arrangement. The present invention provides means for compensating for these departures from ideal conditions, the means providing for increasing the length of movement of either the pull-out arm grippers or of the push-in arm grippers or both and separately for each arm. These means have been described. Now their effects will be explained by reference to the diagrams of Figs. 48–54. In these figures a workpiece W has been shown to have one corner cut off so its initial and inverted positions may be readily followed. The center of carriage movement is denoted by a small circle and the workpiece seating space in the presses is designated by the press designations P–1 and P–2.

Fig. 48 represents the ideal condition where the turning center of the workpiece W is pulled out to the center of the carriage crankshaft, where this condition still prevails when the workpiece is inverted, as shown for simplicity at the bottom of the figure, and where the workpiece, when pushed into the second press exactly fits in its proper position.

Fig. 49 represents a condition in which the presses are spaced further apart than the workpiece would be moved by the basic stroke of the handler. Here the center line between presses, shown by a light dot-and-dash line, is located to the right of the handler center line by a distance y. The basic carriage stroke is designated as b and the same distance for workpiece pull-out and push-in are designated respectively as b' and b". The two widths of the workpiece on the sides of the turning or flip-over center are designated a and a' and the two half-distances between the adjacent press edges are designated c and c'. It will be seen that the workpiece when pulled out to the handler center line is short of the press center line by the distance y and when it is turned over and fed in it will be short of the second press position by the distance 2y.

The correction for this is shown in Fig. 50. Here the pull-out grippers move the workpiece the same distance as in Fig. 49, but the over-travel or programming devices 98, etc. of the push-in arms have been set to move the workpiece through the distance 2y while the carriage is moving it through its normal distance b. The total distance traveled by the workpiece is b" plus 2y, which places it exactly in correct position in the second press.

Fig. 51 shows a condition where the carriage travel is greater than that required by the distance between presses, the carriage center line being beyond the mid-press line by the distance y. In this case the workpiece is overfed by the distance 2y.

The correction for this is shown in Fig. 52. Here the over-travel devices of the pull-out arms have been set to pull out the workpiece by a distance of approximately 2y while the carriage is moving it the usual distance b'. The total distance of travel is b' plus about 2y. Consequently, when the workpiece is inverted on the handler center line it is shifted back by the distance of about 2y from the axis of turning, that is, by the distance of about 2y behind the press center line. Then when the feed-in arm grippers move the workpiece by the usual distance b" it is placed near the correct position in the second press. However, it is difficult to attain the necessary exactness so the push-in over-travel devices are set to move the workpiece a slight additional distance z so that the workpiece will be positioned accurately in the dies of the second press.

Fig. 53 shows a condition in which the die spaces are angularly misaligned so that the workpiece is angularly out of position in the second press dies and also in which the press and handler center lines do not coincide, as shown at the lower right-hand corner of the view.

Fig. 54 shows how compensation is made for this by having both pull-out arms provide some over-travel, but more in one than the other, and by having both push-in arms provide some over-travel, but more in one than the other.

Of course the errors and corrections do not have to be figured out in practice in the precise manner described above since the adjustments are quickly made and a few trials will be enough to obtain the precise delivery desired.

The motor 40 which operates the carriage, as shown in Fig. 55, is powered from a three-phase supply controlled by a multiple-contact switch Z2. The brake-clutch device 160 which controls the action of the carriage is connectible to a single-phase supply through a suitable rectifier and relay device 165 together with relay switches which will be described presently. For any period of operation the motor is started and kept running continuously. To start the motor a start pushbutton PB-1 is closed to energize relay Z which locks in on its own switch Z1 and closes the multiple contact motor switch Z2. There are various safety elements in the motor controls but these are here omitted for simplicity. The motor can be stopped whenever desired by a stop pushbutton PB-2.

It is necessary to have certain coordination between the server and the presses which it serves to insure that the press is open and in running condition before the server can operate and to assure that the presses do not interfere while the server is operating. Before staring the description of the circuit and its functions it is to be noted that certain selector switches are provided and that these will first be considered to be in automatic operation position as shown in Fig. 55. To assure in the beginning that the press rams are actually in the clear position there is provided a switch PR–1 which must be in closed position by the action of a press cam PR before the press can be conditioned for operation by closing a pushbutton PB–3. If switch PR–1 is closed and pushbutton PB–3 is pressed in it causes start relay S to be energized. This relay closes a switch S1. Clousure of PB–3 also energizes a press control relay R which locks in on its own swtich R1. Switch R1 also serves to lock in relay S.

Relay S, after a suitable time delay closes a switch S2–TC ("TC" meaning that there is a time delay in closing and "TO," where used, meaning a time delay in opening) in a press control circuit which permits the press to be cycled when all conditions are right. The circuit of relay S through switch S1 contains a switch PR–2 which is closed each time after the press-run button circuit is closed. This is a usual press circuit and not shown herein. If S1 is open the closing of PR–2 will not produce the run lock-up of the press.

Relay R, when locked in at R1, will remain energized and will keep closed a switch R2 of a press run circuit. A stop pushbutton PB–4, when opened, will de-energize relay R and prevent operation of the presses.

Means are provided for operating the handler clutch with safety. As seen near the bottom of Fig. 55, if a server-operated cam A4 is in a given position with its switch A4–1 closed (here when the handler is in the idle position "A" of Fig. 34) and a run lock-in pushbutton PB–5 is closed, a relay K will be energized and will lock in on its switch K1 against any further control by cam switch A4–1 during normal operations. The relay K opens a switch K4 to prevent manual operation of the grippers and programming devices. The energization of relay K also closes a switch K2 in the circuit of a clutch relay N. Switch K2 will remain closed but it does not alone control the action of relay N. Relay K at the same time closes a switch K3 and energizes a relay F. A pushbutton PB–7 is provided for breaking the lock circuit of relay K to stop the action of the machine.

When energized, relay F locks in on its switch F1 and at the same time opens a switch F3 and closes a switch F4–TO in the energizing circuit of relay N. After a time delay the relay F opens its switch F2–TO and becomes de-energized. This immediately causes its switch F3 to close but switch F4–TO requires time to open and during this time relay N will be energized. It locks in on its switch N1.

When energized, relay N closes a switch N2 in the circuit of the clutch operator device 165. After the time delay thus provided the carriage clutch is engaged and the carriage starts its movement.

The carriage operating mechanism, already described, provides some pause at the ends of the stroke because of dead center action. However, it is desirable to have more pause than is thus provided for the gripper operation and the transfer of the workpieces. The means provided for this purpose includes a relay H which is under the direct control of a cam operated switch A1–1 which twice in a cycle at the proper times is closed by a cam A1. When relay H is energized it at once closes its switch H1 and opens its switch H2–TC, both at the clutch. Relay H is energized only momentarily by the cam switch A1–1 and when it is de-energized it at once opens its switch H1; but switch H2–TC requires time to close and during this time the clutch is kept disengaged. When H2–TC closes, the clutch is re-engaged because switch N2 has remained closed. As stated, this occurs at each end of the carriage stroke, the cam A1 having two pips or lobes for this purpose.

At the end of a cycle the clutch relay N is deenergized by the opening of a switch A2–1 in the lock circuit of switch N1 by a cam A2.

Means are provided for operating the grippers of the carriage and flip-over device and the travel changing means of the grippers at the proper times. The grippers 55 of both the pull-out and push-in arms are all operated at the same time through the action of valve solenoids 55a and 55b to close and open respectively. The flip-over grippers are operated through the action of valve solenoids 58a and 58b to close and open respectively. The travel changing or programming power devices for the carriage gripper arms are operated through the action of valve solenoids 98a and 98b for forward and return movement, respectively.

The carriage grippers 55 are closed by energizing solenoid 55a through the action of a server cam A8 and its switch A8–1. Solenoid 55b is energized to release the grippers through the action of a handler cam A9 and its switch A9–1. Closure of A9–1 energizes a relay D which locks in on its switch D1. It opens a switch D4 and closes a switch D2–TO, the switches D4 and D2–TO being in series in the line to the solenoid and the net immediate effect being to leave the solenoid de-energized. After a time delay the relay D opens a switch D3–TO and de-energizes itself. This recloses D4 and since D2–TO requires a time delay to open, the solenoid 55b is energized. After this D2–TO opens.

The flip-over gripper solenoid 58a is energized through a server cam A10 and its switch A10–1 to close the grippers. The solenoid 58b is energized through a server cam A11 and its switch A11–1 to open the flip-over grippers.

The travel changing or programming solenoid 98a for extending all of the arms 52 and 54 is energized through a server cam A5 and its switch A5–1. The return solenoid is energized through a server cam A6 and its switch A6–1.

When PB–5 is pushed in and if position check switch A4–1 is closed, the server will operate through a full cycle with pauses at each end of the carriage stroke. If, at the end of a cycle, a momentarily closed normally open switch PC–1 is closed by a press control, not shown, which indicates that it is ready for the server to be operated, the server will re-cycle itself and operate through another cycle. This action will continue as long as the machine is set for automatic operation and so long as the stop pushbutton PB–7 is not pushed.

For manual operation a selector switch S1 in the press coordinating circuit is moved from the position shown in which its contacts S1–1 and S1–2 are closed to a position where S1–3 is closed. The closing of S1–3 simply replaces the function of relay switch R2 and no other tie-in with the press is needed.

Also, a selector switch S2 is moved from the illustrated position in which its "auto" contacts S2–1 are closed to a position where its "manual" contacts S2–2 are closed. When the lock-in pushbutton PB–5 is closed it has no effect, but a connected pushbutton switch PB–6 closes a line through S2–2 to a cam switch A3–1 operated by a server cam A3 to energize a relay M. When energized relay M closes a switch M1 to energize a relay L and this relay locks in on its switch L1. It opens a switch L2 and closes a switch L3 to the clutch relay N. Pushbutton switch PB–6 can be held in intermittently to inch the carriage or can be held in continuously to carry the carriage through a full stroke. After about a full stroke has been made the cam A3 moves the switch A3–1 off of its lower contact to de-energize the relay M. Since L2 is open, clutch relay N will be de-energized and the machine will stop. If now the pushbutton PB–6 is opened, the relay L will be de-energized and switch L2 will close. When PB–6 is again closed, it will energize relay N directly and switch A3–1 will be dropped to its lower contact so normal manual operation can be resumed.

The grippers can be operated at any time by manual control. It is hardly necessary to operate the programming means manually. A selector switch S3 can be moved down from the illustrated position in which its switches S3–1 and S3–2 are closed to a position in which its switch S3–3 is closed. Switch K4 will be closed because relay K is not energized. A ganged switch S4 has contacts S4–1 for energizing closing solenoid 58a of the flip-over grippers and contacts S4–2 for energizing the closing solenoid 55a of the carriage grippers. Another ganged switch S5 has contacts S5–1 for energizing the opening solenoid 58b of the flip-over grippers and contacts S5–2 for energizing the opening solenoid 55b of the carriage grippers.

By selective operation of the switches S3, S4 and S5 the grippers may be operated as desired provided switch K4 for automatic operation is not open.

It will now be seen that the invention provides a machine of a wide range of action, adaptability and adjustment for accomplishing the objects of the invention.

While one embodiment of the invention has been described in detail for purposes of illustration, it is to be understood that there may be various embodiments within the scope of the invention.

What is claimed is:

1. Article handling apparatus comprising in combination, a reciprocatory device, a plurality of article-engaging means carried by said reciprocatory device, said article-engaging means being spaced apart on the reciprocatory device in the direction of its movement to carry a plurality of articles simultaneously in the spaced-apart relationship longitudinally with the basic movement of said reciprocatory device, the different article-engaging means of the reciprocatory device engaging an article successively at different parts of its length in the direction of movement to move it along in steps by one article-engaging means after another, means for supporting an article in an intermediate position after its release by one of said article-engaging means and holding it in position for engagement by a successively acting one of said article-engaging means, and other means having movement independently of the movement caused by the article-engaging means of said reciprocatory device for changing the position of a single article left on said supporting means between the time the article is initially and finally engaged by said reciprocatory article-engaging means of said handling apparatus.

2. Article handling apparatus as set forth in claim 1, which is further characterized by the fact that said last-mentioned means for independently changing the position of a single article acts upon and through article-engaging means which engage an article at a different position from that engaged by any of said article-engaging means on the reciprocatory device.

3. Article handling apparatus as set forth in claim 1, which is further characterized by the fact that said last-mentioned means for independently changing the position of a single article comprises separately controlled article-engaging units for acting independently of said plurality of article-engaging means on said reciprocatory device.

4. Article handling apparatus as set forth in claim 1, which is further characterized by the fact that said last-mentioned means for independently changing the position of a single article acts upon an article after it is released from a preceding article-engaging means and before it is engaged by a succeeding article-engaging means.

5. Article handling apparatus as set forth in claim 1, further characterized by the fact that means are provided for changing the elevation of at least one of said plurality of reciprocatory article-engaging means relative to the reciprocatory device during its reciprocatory movement.

6. Article handling apparatus as set forth in claim 5, further characterized by the fact that the means for changing the elevation of the article-engaging means comprises a cam along which a part associated with the article-engaging means moves as it travels longitudinally.

7. Article handling means as set forth in claim 1, further characterized by the fact that said means for supporting an article in an intermediate position has associated with it a means for inverting the article.

8. Article handling means as set forth in claim 7, further characterized by the fact that said inverting means includes an operating connection with said reciprocatory device, and independently actuated means for engaging and disengaging an article.

9. Article handling means as set forth in claim 7, further characterized by the fact that said inverting means includes a member having a pivotal connection with said reciprocatory device and a linkage connection with a slide which cooperates with a fixed guide.

10. Article handling means as set forth in claim 1, further characterized by the fact that said article-engaging means engage an article at its front and rear edges in succession and which further includes intermediate article-holding means which engage a side edge of the article.

11. Article handling apparatus comprising in combination, a reciprocating carriage having means for moving an article between two positions of rest at each end of its travel, and an intermediate position at which a preceding moving means deposits it and from which a succeeding moving means removes it, article holders on each end of the carriage, and article inverting means movable in coordination with the movement of the carriage, said inverting means having means for grasping an article while it is in the intermediate position at rest and held by holders on the carriage at one end of its travel and for releasing the article at the other end of the carriage travel after the other holders on the carriage have engaged it.

12. Article handling apparatus as set forth in claim 11, further characterized by the fact that said article inverting means is operated by the carriage.

13. Article handling apparatus as set forth in claim 11, further characterized by the fact that said article inverting means is operated by the carriage and includes a swingable first link pivoted to the carriage, a swingable second link pivoted to a fixed support, and a third link pivoted to the first and second links and having slide guided restraining means along its length.

References Cited in the file of this patent

UNITED STATES PATENTS

| | | |
|---|---|---|
| 1,631,203 | Hitchcock | June 7, 1927 |
| 1,811,832 | Mayers | June 23, 1931 |
| 1,828,307 | Been | Oct. 20, 1931 |
| 1,933,225 | Smith | Oct. 31, 1933 |
| 1,948,558 | Beutel | Feb. 27, 1934 |
| 2,165,641 | Mattox | July 11, 1939 |
| 2,493,493 | Mariano | Jan. 3, 1950 |
| 2,633,809 | Robinson et al. | Apr. 7, 1953 |
| 2,658,633 | Holcroft | Nov. 10, 1953 |
| 2,714,324 | Dinsmore et al. | Aug. 2, 1955 |